US012506362B2

United States Patent
Khaira et al.

(10) Patent No.: US 12,506,362 B2
(45) Date of Patent: Dec. 23, 2025

(54) SELF-POWERED AUTONOMOUS RECONFIGURABLE INTELLIGENT SURFACES USING WIDE RADIO FREQUENCY POWER RANGE HARVESTING CIRCUIT

(71) Applicant: Dell Products L.P., Round Rock, TX (US)

(72) Inventors: Navjot Kaur Khaira, Manotick (CA); Tejinder Singh, Manotick (CA)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/669,852

(22) Filed: May 21, 2024

(65) Prior Publication Data

US 2025/0364837 A1    Nov. 27, 2025

(51) Int. Cl.
*H02J 50/00* (2016.01)

(52) U.S. Cl.
CPC .......... *H02J 50/001* (2020.01); *H02J 50/005* (2020.01)

(58) Field of Classification Search
CPC .............................. H02J 50/001; H02J 50/005
See application file for complete search history.

(56) References Cited

U.S. PATENT DOCUMENTS

| 11,942,795 | B1 | 3/2024 | Tsai et al. |
| 2007/0046547 | A1* | 3/2007 | Crouch ................ H01Q 21/061 |
| | | | 343/754 |

(Continued)

FOREIGN PATENT DOCUMENTS

| CN | 110635697 A | * | 12/2019 | |
| CN | 111262045 A | * | 6/2020 | ............... H01Q 1/38 |
| WO | WO-2024047370 A1 | * | 3/2024 | |

OTHER PUBLICATIONS

Liu, Reconfigurable Intelligent Surfaces: Principles and Opportunities, IEEE Communications Surveys & Tutorials, vol. 23, No. 3, Third Quarter 2021, pp. 1546-1577 (Year: 2021).*

(Continued)

*Primary Examiner* — Pinping Sun
(74) *Attorney, Agent, or Firm* — Amin, Turocy & Watson, LLP

(57) ABSTRACT

The technology described herein is directed towards a reconfigurable intelligent surface (RIS) that harvests RF energy from incoming signals. In one implementation, there are two types of RIS elements (unit cells), one type engineered to capture and wirelessly harvest energy from incoming electromagnetic waves, while the other type redirects the incoming signals towards a predetermined direction. The harvested energy is combined and converted to DC power using a harvesting circuit. In one implementation, a dual-mode energy harvesting circuit employs a higher power rectifier sub-circuit and a lower power rectifier subcircuit, with a multiport circulator and switch that self-actuates to use one or the other rectifier subcircuit based on the combined RF input power captured by the energy harvesting elements. A multiple battery approach is described, in which one battery is charging based on the converted DC power, another, previously-charged battery is powering the reconfigurable intelligent surface components.

20 Claims, 15 Drawing Sheets

(56) References Cited

U.S. PATENT DOCUMENTS

| | | | | |
|---|---|---|---|---|
| 2012/0146425 | A1* | 6/2012 | Lee | H04B 5/24 307/104 |
| 2012/0153888 | A1* | 6/2012 | Jung | H02J 7/35 320/101 |
| 2012/0235860 | A1* | 9/2012 | Ghazarian | G08B 21/0202 342/357.54 |
| 2020/0227818 | A1* | 7/2020 | Huang | H01Q 1/248 |
| 2020/0336023 | A1* | 10/2020 | Zeine | G06N 3/08 |
| 2021/0203830 | A1 | 7/2021 | Liu et al. | |
| 2022/0037123 | A1* | 2/2022 | Zhang | H01J 37/32174 |
| 2022/0314833 | A1* | 10/2022 | Jiang | H02J 7/007 |
| 2023/0097967 | A1* | 3/2023 | Saboury | H01M 10/441 320/113 |
| 2024/0235271 | A1 | 7/2024 | Tayyab et al. | |
| 2024/0339754 | A1* | 10/2024 | Tam | H04B 5/79 |
| 2025/0007567 | A1 | 1/2025 | Haustein et al. | |
| 2025/0187478 | A1 | 6/2025 | Ferone | |
| 2025/0244159 | A1 | 7/2025 | Anderson | |

OTHER PUBLICATIONS

Marian, "Potentials of an Adaptive Rectenna Circuit," IEEE Antennas and Wireless Propagation Letters, vol. 10, 2011,pp. 1393-1396 (Year: 2011).*

Control Network Newsletter, "Why You Should Not Mix Full-Wave and Half-Wave Powered Devices" pp. 1-2, 2020 (Year: 2020).*

Hillman, Scaleable Vanadium Dioxide Switches with Submillimeterwave Bandwidth VO2 switches with improved RF bandwidth and power handling, Oct. 1, 2017 IEEE Compound Semiconductor Integrated Circuit Symposium (CSICS), pp. 1-4 (Year: 2017).*

Y. Zhuang, J. Cappos, T.S. Rappaport et al., "Future Internet bandwidth trends: An investigation on current and future disruptive technologies", Secure Systems Lab, Dept. Comput. Sci. Eng., Polytech. Inst. New York Univ., New York, NY, USA, Tech. Rep. TR-CSE-2013-04, Nov. 1, 2013, 27 pages.

M. Poulakis, "Metamaterials Could Solve One of 6G's Big Problems [Industry View]," in Proceedings of the IEEE, vol. 110, No. 9, pp. 1151-1158, Sep. 2022.

A. Taha, M. Alrabeiah, and A. Alkhateeb, "Enabling Large Intelligent Surfaces with Compressive Sensing and Deep Learning," in IEEE Access, vol. 9, pp. 44304-44321, 2021.

C. Liaskos, G. Pyrialakos, A. Pitilakis et al., "ABSense: Sensing electromagnetic waves on metasurfaces via ambient compilation of full absorption," in Proceedings of the Sixth Annual ACM International Conference on Nanoscale Computing and Communication, 2019, 7 pages.

N. Tesla, "The transmission of electric energy without wires," in Electrical World and Engineer, 1904. 2 pages.

J. Curty, M. Declercq, C. Dehollain, and N. Joehl, "Design and optimization of passive UHF RFID systems," vol. 323. New York: Springer, 2007. 150 pages.

M. Awad, P. Benech, and J.-M. Duchamp, "Design of Dickson Rectifier for RF Energy Harvesting in 28-nm FD-SOI technology" in 2018 Joint International EUROSOI Workshop and International Conference on Ultimate Integration on Silicon (EUROSOI-ULIS), IEEE, 2018. 4 pages.

C. Hillman, P. Stupar and Z. Griffith, "Scaleable vanadium dioxide switches with submillimeterwave bandwidth: VO2 switches with improved bandwidth and power handling," in 2017 IEEE Compound Semiconductor Integrated Circuit Symposium (CSICS), Miami, FL, USA, 2017, pp. 1-4.

Khaira, et al. "Autonomous Reconfigurable Intelligent Surface Using Antennas and Power-Dependent Switchable Rectification Mechanism" U.S. Appl. No. 18/734,579, filed Jun. 5, 2024, 43 pages.

Khaira, et al. "Self-Powered Reconfigurable Intelligent Surfaces Utilizing Radio Frequency Energy Harvesting" U.S. Appl. No. 18/614,932, filed Mar. 25, 2024, 45 pages.

Khaira, et al. "Channel Estimation in a Reconfigurable Intelligent Surface Using Substrate Integrated Waveguides" U.S. Appl. No. 18/613,388, filed Mar. 22, 2024, 38 pages.

Notice of Allowance received for U.S. Appl. No. 18/734,579 dated Oct. 1, 2025, 10 pages.

* cited by examiner

SELF-POWERED AUTONOMOUS RECONFIGURABLE INTELLIGENT SURFACES USING WIDE RADIO FREQUENCY POWER RANGE HARVESTING CIRCUIT

BACKGROUND

Reconfigurable intelligent surfaces (alternatively referred to as intelligent reflective surfaces, or metasurfaces) are manmade thin reflective or refractive surfaces whose electromagnetic response can be electronically controlled. A reconfigurable intelligent surface is generally characterized by having a two-dimensional planar array of electronically controllable reflecting elements that can dynamically manipulate electromagnetic waves. These elements are capable of altering the phase shift of the reflected signals, whereby through precise adjustment of these phase shifts, sophisticated reflect beamforming can be executed.

Many reconfigurable intelligent surface designs are passive, in that they reflect the signals without needing additional amplification. However, there is still non-negligible power consumed for manipulating the phase shifts.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
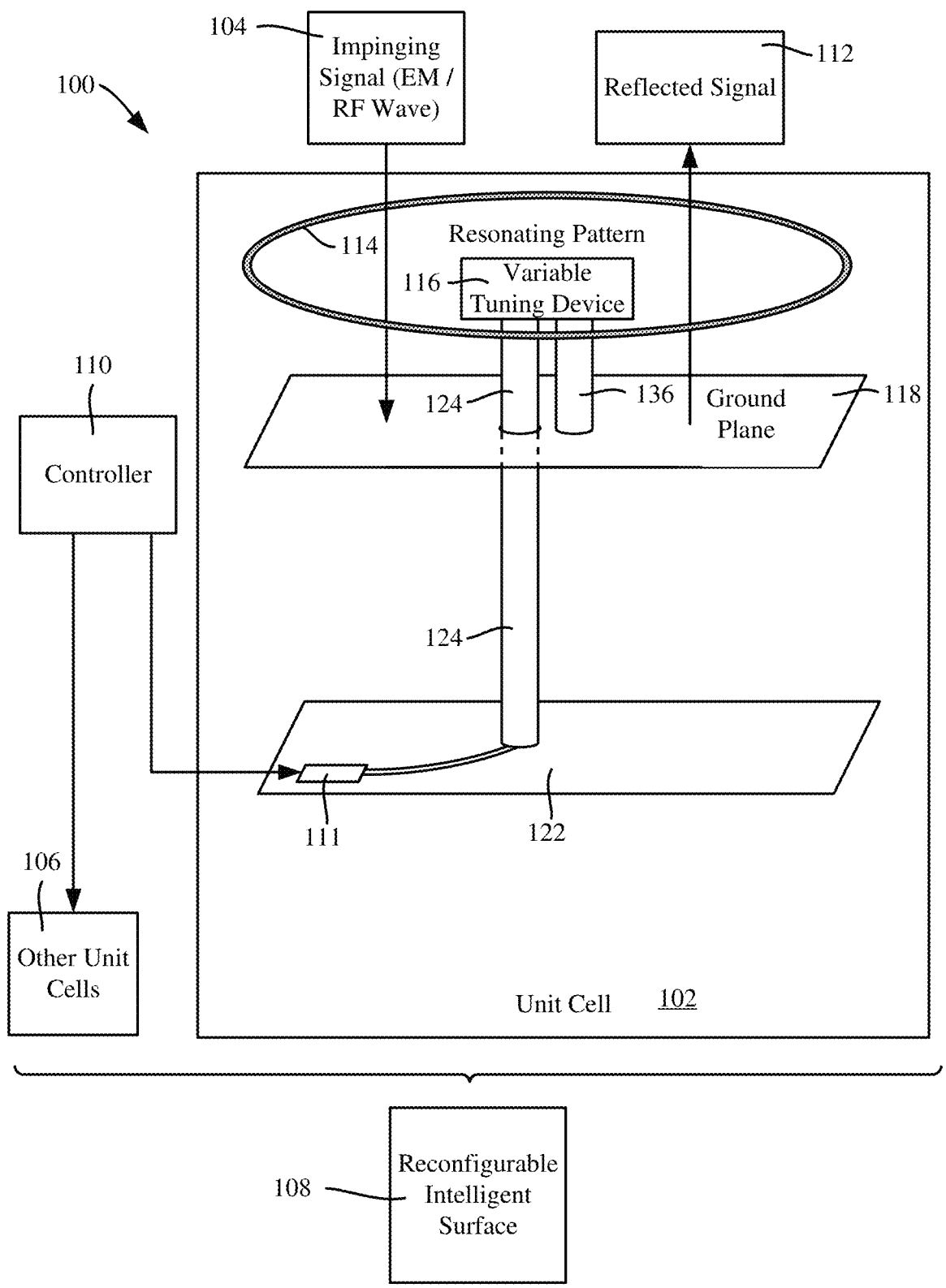
FIG. 1 is an example conceptual block diagram showing an example system that includes a unit cell of a reconfigurable intelligent surface for reflecting an incoming electromagnetic signal, in accordance with various example embodiments and implementations of the subject disclosure.

The technology described herein is generally directed towards a reconfigurable intelligent surface that includes integrated energy harvesting circuitry, where in general, energy harvesting refers to extracting energy from the surrounding environment. As described herein, the harvested energy is used to power the components of the reconfigurable intelligent surface, including for tuning the phases of the unit cells, in order to controllably redirect an incoming electromagnetic wave. In this way, the harvested electromagnetic energy can partially or fully self-power the reconfigurable intelligent surface module to enhance network energy efficiency. At the same time, energy harvesting is accomplished in conjunction with the incoming signal energy being reflected in a controlled shape and/or direction.

In one implementation, there are two types of unit cells at the unit cell level in a reconfigurable intelligent surface, one type configured for redirecting (e.g., reflecting or refracting) an incoming electromagnetic wave, and another type configured for harvesting energy from the incoming electromagnetic wave. For signal redirection, the unit cells include a variable tuning element, such as a varactor that changes capacitance according to applied bias voltage values. A controller (e.g., control unit) manages the bias for the reconfigurable intelligent surface's unit cells that are used for signal redirection, such as to separately adjust their phase shifts to produce constructive interference in a desired beamforming direction and/or beam strength. For energy harvesting, a portion of the incident wave (e.g., as much as possible) is coupled to a substrate integrated waveguide incorporated into a second type of unit cell. In turn, at least some of the portion is output from a probe that extends into the substrate integrated waveguide to an electrical energy harvesting contact. The contacts from the (typically many) harvesting unit cells are coupled to charging circuitry; more particularly, the separately harvested energy portions are coupled via the contacts to a radio frequency (RF) power combiner, which outputs the combined energy to an impedance matching circuitry, and then to a wide range power rectifier to obtain DC (direct current) power. The use of RF power combiners eliminates or helps reduce the need for various groups of multiple rectifiers and impedance matching networks, effectively minimizing energy loss attributed to RF impedance mismatches. In this way, an amount of an incoming signal is coupled to the substrate integrated waveguide, which can be output as harvested energy. Note that the amount of coupled energy into the substrate integrated waveguide, and at the electrical energy harvesting contact, can be adjusted during design of a reconfigurable intelligent surface.

In one implementation, the wide range power rectifier includes two rectifier subcircuits, one designed for lower RF power, and another designed for higher RF power; the RF power can range from −20 dBm to +30 dBm, for example. A power dependent self-actuating RF switch, in conjunction with a circulator to which the RF input energy is input, automatically self-actuates to switch the RF input energy to the higher power rectifier at a crossover point of +19 dBm, for example, such that high energy conversion efficiency results as described herein, and de-self-actuates below the crossover point resulting in the RF input energy being coupled to the lower power rectifier to maintain high efficiency. In one particular example, a seven-stage rectifier designed with low power diodes having lower threshold voltages is used for low power conditions, while a ten-stage rectifier designed with diodes having higher threshold voltages is used for higher power conditions.

In one implementation, two distinct energy storage devices (e.g., batteries or capacitors) are available, one for charging via the harvested energy as rectified into DC output, and one for providing power for the reconfigurable surface tunable components. In the example of batteries, one battery is charged with the RF coupled harvested energy, while the other, previously charged battery, supplies power to the electronic components. A power management module (e.g., an intelligent device) monitors the battery power levels, and based on at least one of the levels satisfying a threshold level, simultaneously switches the roles of the batteries from discharging power to charging, and vice-versa, adopting a "harvest-store-use" model as opposed to a more traditional "harvest-use" model.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in communications and computing in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a conceptual depiction of an example system 100 including a unit cell 102 of a type that reflects incoming signals 104. The unit cell 102, in conjunction with other unit cells 106, forms a reconfigurable intelligent surface 108.

The example unit cell type is coupled to a controller 110 through a single pad 111 on the bottom metal layer for DC voltage application from the controller. More particularly, for redirecting impinging signals, the reconfigurable intelligent surface 108 is coupled to or otherwise incorporates the controller 110 that controls the phase shifts of the type of unit cells designed for signal redirection. This allows the incoming electromagnetic wave/signal 104 to be redirected (reflected or refracted) as a beam 112 that can be shaped and steered in a desired direction.

In one implementation, the unit cell 102 includes a resonating pattern 114 of metallic elements, such as including a generally ring-shaped resonator configured to resonate when the incoming electromagnetic (EM)/radio frequency (RF) wave 104 is impinging on the unit cell 102, such as an RF signal near or within the millimeter wavelength, e.g., (above 25 gigahertz). In general, the metallic resonating pattern 114 is designed to resonate at a frequency that corresponds to the frequency of the incoming signal. As set forth herein, a unit cell 102 can have a resonating pattern 114 of any suitable shape (e.g., square, rectangular, concentric ring-shape, coupled circles and so on) that resonates at a corresponding frequency of the incoming signal, and is thus not limited to any particular pattern. Note that in the examples herein, a unit cell 102 is designed for operation at 28 GHz; notwithstanding, the technology described herein can be easily extended to other frequency ranges.

In general, the metallic resonating pattern 114 is designed for operation at a desired resonance frequency that corresponds to the frequency of the incoming signal 104. A variable tuning device 116 (e.g., surface mounted inside the resonating pattern's ring, which can be a varactor, a PIN diode, an array of fixed capacitors, an array of fixed inductors, or a capacitance tuning device with the capability of changing the capacitance of the unit cell 102) terminates at the ground plane 118 by way of a via 120.

The resonating pattern 114 and variable tuning device 116 are designed for operation at the desired resonance frequency, with a change in capacitance of the variable tuning device 116 determined by bias voltage as applied by the controller 110 to the pad 111, which rests on a bottom metal layer 122; a via 124, insulated from the ground plane 118, conducts the bias voltage to the variable tuning device 116. The change in capacitance makes the phase of the unit cell 102 reconfigurable. In this way, each unit cell such as the unit cell 102 is capable of offering a reconfigurable phase to the incoming EM signal when provided with different voltage levels to the variable tuning device 116. When the phases of the individual unit cells are appropriately chosen and voltage-controlled by the controller 110 via the variable tuning device 116, the various phases modify the reflected electromagnetic wave, such as to result in constructive interference in a desired reflection direction. Note that such a variable tuning device (e.g., varactor) can be integrated into the unit cell, or can be a commercial product coupled (e.g., surface mounted) to the unit cell. Further, instead of or in addition to varactors, integrated tuning can be accomplished with PIN diodes, as well as any mechanism that can tune a unit cell's phase.

FIGS. 2-5 are generally directed towards another example type of unit 202 cell that is mainly configured for energy harvesting, although a variable tuning device 216 is also depicted; (note that in FIG. 2, unit cell components similar to those of FIG. 1 are labeled 2xx instead of 1xx).

Figure 2:
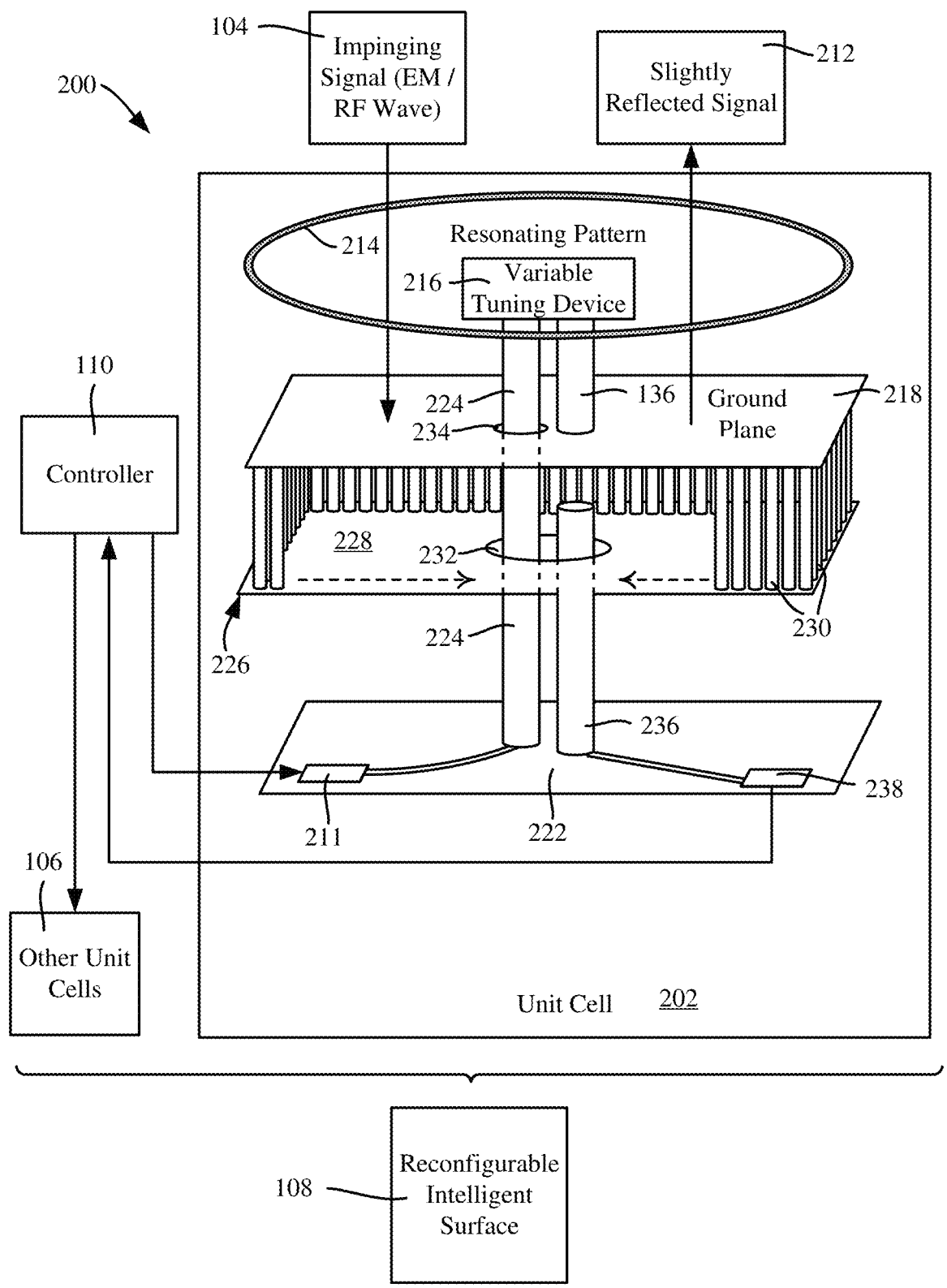
FIG. 2 is an example conceptual block diagram showing an example system that includes a unit cell of a reconfigurable intelligent surface for harvesting a portion of the incoming signal energy, in accordance with various example embodiments and implementations of the subject disclosure.

In the example implementation of FIG. 2, the ground plane 218 of the unit cell 202 also acts as the top surface of a substrate integrated waveguide 226. As described with reference to FIGS. 2-5, the substrate integrated waveguide 226 captures a portion of the energy of the incoming EM signal.

In general, a substrate integrated waveguide is essentially a waveguide that is integrated into a dielectric substrate. Substrate integrated waveguides are a form of transmission line used in microwave and millimeter-wave circuits. They effectively bridge the gap between conventional rectangular waveguides and planar circuits. A substrate integrated waveguide is bounded by two parallel metal plates (top 218 and bottom 228), with the sides of the top plate typically perforated with an array of metal-filled via holes. The via holes facilitate the inclusion of the metal side vias 230 that act as sidewalls of the waveguide, confining the electromagnetic waves between them. Substrate integrated waveguides offer several advantages over the conventional waveguides, including that they enable waveguide structures to be incorporated into standard planar circuit technologies, making them suitable for compact and integrated circuit designs. By integrating the waveguide into the substrate, substrate integrated waveguides structures can be fabricated using conventional printed circuit board (PCB) or semiconductor manufacturing techniques. Additionally, they can operate over a wide frequency range, including at high frequencies such as millimeter wave frequencies, making them suitable for various applications.

The substrate integrated waveguide 226 thus includes a metal bottom layer 228, with the interior of the substrate integrated waveguide 226 enclosed by metal side vias (collectively 230), which are configured (based on the signal's wavelength) as separated metal-filled via holes, or sidewalls, with respect to not letting the portion of the incoming EM signal leak out (to ensure accurate waveguide operation at the designed frequency corresponding to the incoming electromagnetic signal). Note that some of the side vias in the front view of the substrate integrated waveguide 226 have been intentionally omitted to help view the interior of the substrate integrated waveguide 226; the left and right dashed arrows inside the substrate integrated waveguide 228 are intended to convey that the metal side vias 230 fully extend across the front side, as do the metal side vias on the other sides.

Note that the via 224 passes through the substrate integrated waveguide 226 at a lower opening 232 and an upper opening 234. To obtain the energy from the portion of the signal energy captured by the substrate integrated waveguide 226, an RF-coupled via probe 236 extends into the substrate integrated waveguide 226 through the bottom opening 232. This picks up at least some of the portion of the EM energy captured within the substrate integrated waveguide 226, and provides the picked-up energy as electrical output to an electrical energy harvesting contact 238 (e.g., in the form of a pad) to serve as an energy source. As described herein, this energy source is combined with the energy similarly harvested from other harvesting-type unit cells to provide power (which can be directly or indirectly through charging energy storage devices) to the components of the reconfigurable intelligent surface 108, including the controller 110.

It should be noted that a unit cell designed for signal reflection can also include a substrate integrated waveguide and via probe, which can capture a relatively very small portion of the incoming signals' energy. This captured energy can be used for a purpose other than energy harvesting, such as to determine the angle of arrival of the incoming signal. It is also feasible to use this relatively very small portion for some small amount of energy harvesting. Having each unit cell include a substrate integrated waveguide may make fabrication easier, with only a minor adjustment (e.g., probe size and position, larger, closely proximate probe can capture more energy) made to a unit cell's design for harvesting large amounts of energy instead of reflecting most of the energy, or vice-versa.

Figure 3:
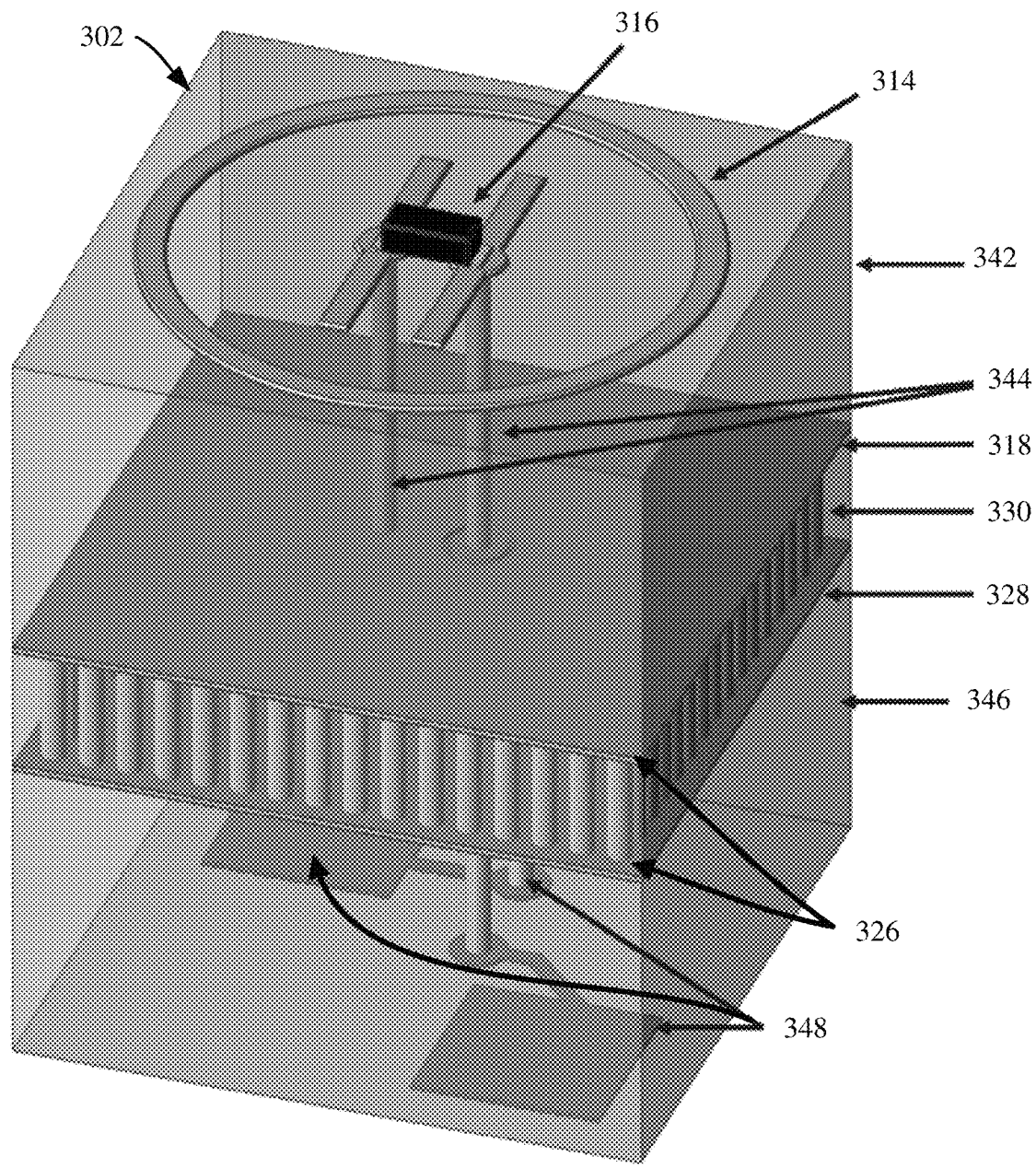
FIG. 3 is a three-dimensional representation of an example unit cell that includes a substrate integrated waveguide for capturing a portion of an incoming electromagnetic signal's energy, in accordance with various example embodiments and implementations of the subject disclosure.
Figure 4:
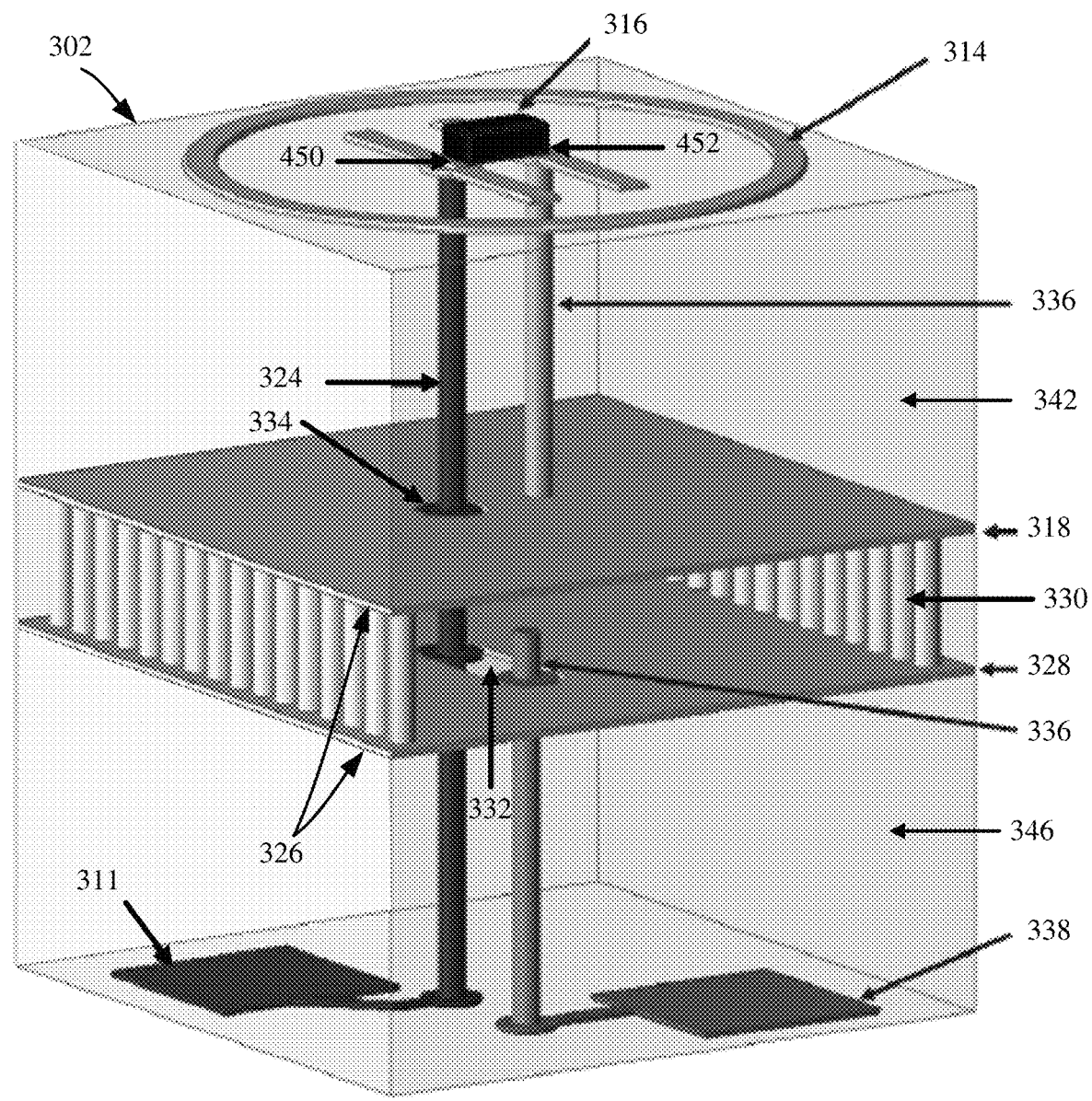
FIG. 4 is enlarged three-dimensional representation of the example unit cell of FIG. 2, depicting an internal part of the substrate integrated waveguide, in accordance with various example embodiments and implementations of the subject disclosure.
Figure 5:
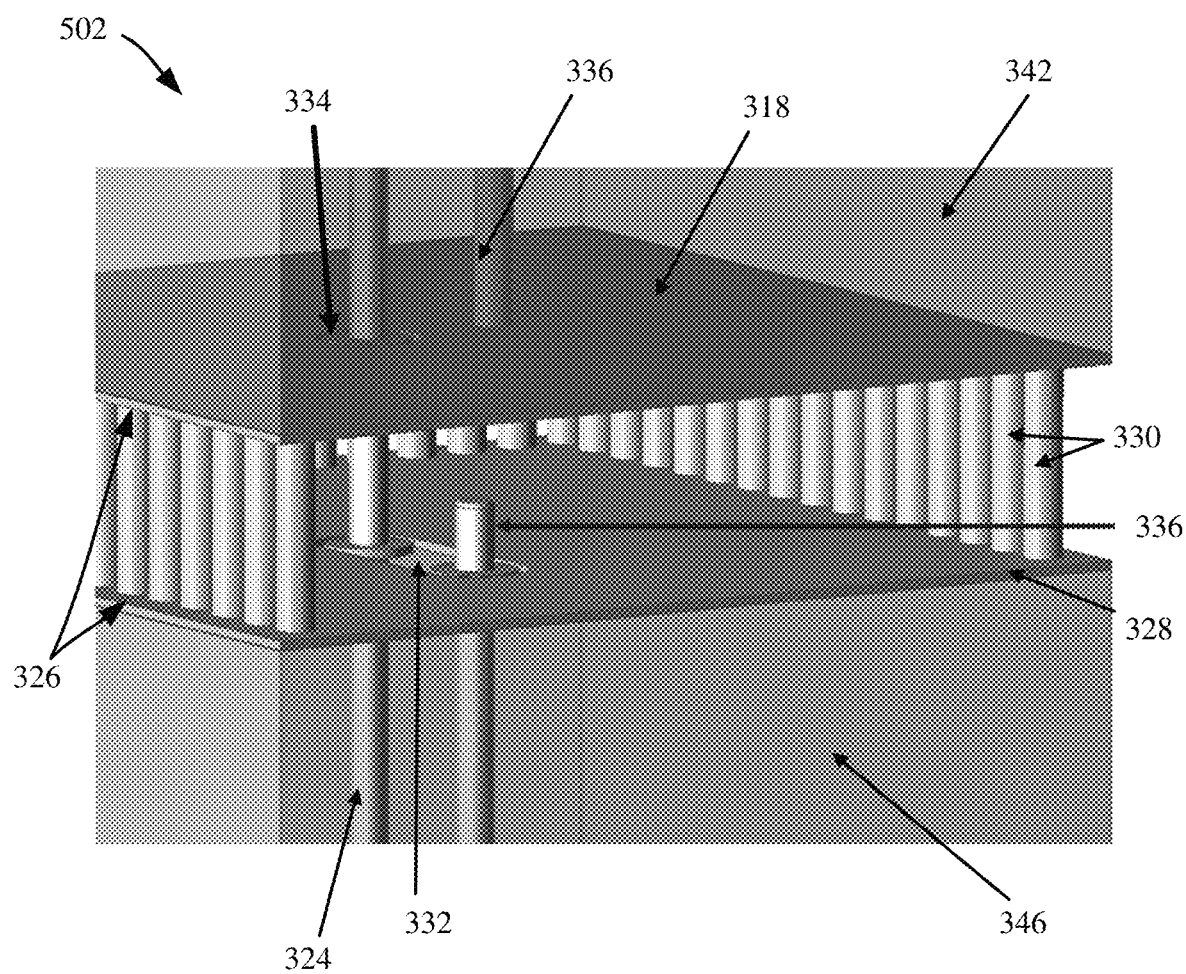
FIG. 5 is a three-dimensional representation of an example unit cell that includes a substrate integrated waveguide, in which some side vias of the substrate integrated waveguide are not visible so as to illustrate an internal part of the substrate integrated waveguide, in accordance with various example embodiments and implementations of the subject disclosure.

FIGS. 3-5 provide additional, three-dimensional views and details of a unit cell 302 of a reconfigurable intelligent surface, which shows the components in a stack of metallic layers and dielectric layers. In FIGS. 3-5, in general labeled components that are similar to those of the conceptual depiction of FIG. 2 are labeled 3xx instead of 2xx.

Thus, as shown in FIG. 3, a reflective element pattern 314 and a varactor 316 are shown at the top of the unit cell stack, supported by a top dielectric substrate 342. The vias for varactor biasing are collectively labeled 344; (note that the unit cell stack can be reoriented such that what can be seen as the left and right bias vias in FIG. 1 can be reversed).

The ground metal layer 318 is beneath the top dielectric substrate 342, and in this example implementation also serves as the top of the substrate integrated waveguide 326. The metal hole/sidewall vias 330 of the substrate integrated waveguide 326 are vertically oriented between the ground metal layer 318 and the bottom metal layer 328 of the substrate integrated waveguide 326. These layers are supported by a bottom substrate 346.

As also shown in FIG. 3, the metal contacts/pads for the varactor DC bias to the varactor and the EM signal and are collectively labeled 348. These pads 348 are beneath (at least in part) the bottom substrate 346 to facilitate straightforward external electrical coupling thereto.

FIG. 4 is another three-dimensional view of the unit cell 302 of FIG. 3, in which some of the sidewalls 330 are omitted to allow the inside of the substrate integrated waveguide 326 to be viewed. As can be seen, most of the labeled components correspond to those described with reference to FIGS. 2 and 3, and in general are not described again for purposes of brevity. Note, however, that unlike FIG. 3, the inside of the substrate integrated waveguide 326 is visible, and therefore shows the coupled via probe 336 extending into the substrate integrated waveguide 326 through the bottom opening 332.

In general, substrate integrated waveguides channel the received signal, and have advantages over alternatives. For example, unlike microstrips, substrate integrated waveguides confine electromagnetic waves within their boundaries, minimizing potential interference. Furthermore, the intersection of vias with microstrips can induce unintended radiation, a scenario counterproductive for a unit cell design. Still further, the level of coupling between the substrate integrated waveguides and the meta-atom can be adjusted by modifying the substrate integrated waveguide's cutoff frequency, or by altering the distance from the via to the substrate integrated waveguide's edges.

FIG. 4 also shows the positive and negative terminal locations 450 and 452, respectively, of the varactor 316. Further, in FIG. 4, the DC bias voltage pad 311 and the electrical sensing contact (EM coupled signal readout pad) 338 are shown as positioned at a layer level separated from the substrate integrated waveguide's bottom metal plate 328 by the dielectric substrate 346.

FIG. 5 is an enlarged view of a section 502 of the substrate integrated waveguide of FIG. 4, highlighting the coupled via probe 336. In one implementation, the reconfigurable intelligent surface ground plane 318 acts as the top metal plane for the substrate integrated waveguide structure, which is enclosed by another metal layer 328 supported by a dielectric 346, as well as enclosed on the sides by the metal vias 330. Under the influence of the incoming signal, the EM energy flows through the voltage or current via 324 of the varactor 314 (FIG. 4). The energy is coupled to the substrate integrated waveguide 326 when the via 324 passes through it.

The varactor via 324, which passes through the ground plane 318 is disconnected from ground by an annular slot 332. This annular slot 332 allows for RF coupling of the incident wave to the substrate integrated waveguide structure. The coupled signal is read/sensed at the output by the coupled via probe 336. The extent of RF coupling can be fine-tuned by varying the annular slot's diameter and the characteristic dimensions of the coupling waveguide. In other words, the probe can be designed at a specific certain distance position/distance to capture part of signal, e.g., a very large percentage for energy-harvesting type unit cells; note that a probe is only one suitable coupling mechanism, and need not be a via as shown in the examples.

To summarize, one example design of an energy-harvesting type unit cell, which is primarily intended for energy collection, can incorporate a reflective element that has a varactor diode mounted on a metallic layer, enabling reconfigurability through voltage-induced capacitance changes. This design allows the unit cell to modify the phase of incoming electromagnetic (EM) signals at 28 GHz, adaptable to other frequencies. The varactor, connected by two vias to the ground and DC voltage pad, facilitates this functionality. The reconfigurable intelligent surface's ground plane serves as the top metal layer for the substrate integrated waveguide structure in an energy-harvesting type unit cell, encapsulated by another metal layer separated by a dielectric, with vias guiding EM energy. This setup enhances the incoming signal coupling to the substrate integrated waveguide, particularly when the varactor via crosses the ground plane, separated by an annular slot for efficient wave transmission. Signal detection occurs through a coupled via probe, with DC and RF signal readout pads positioned at a metal layer below the substrate integrated waveguide's bottom plate, separated by a dielectric layer.

Figure 6:
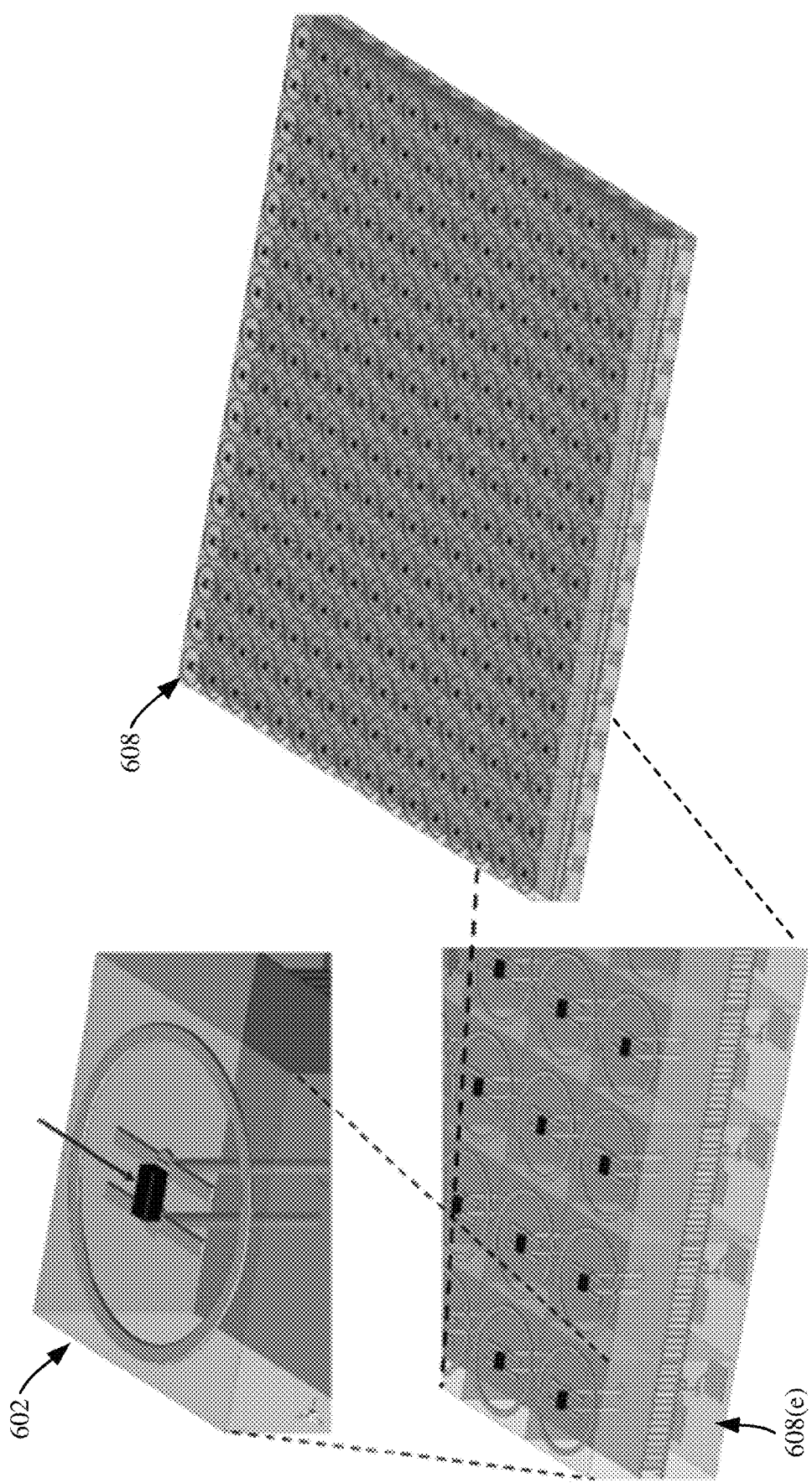
FIG. 6 is a three-dimensional representation of an example reconfigurable intelligent surface, with an enlarged representation of one corner of the reconfigurable intelligent surface, and which also depicts a representation of part of a unit cell in that corner, in accordance with various example embodiments and implementations of the subject disclosure.

The other type of reconfigurable intelligent surface unit cells used for signal reflection terminate at the ground plane and lack an integrated substrate integrated waveguide (although in alternatives they may be present as described herein, e.g., for facilitating fabrication). This signal-redirection unit cell type can include a single pad on the bottom metal layer for DC voltage application and can omit the EM coupled signal readout/harvesting contact pad. The reconfigurable intelligent surface thus can be configured as a two-dimensional (2D) array combining these two types of unit cells into an m×n grid, as depicted in FIG. 6.

More particularly, the reconfigurable intelligent surface is formed by arranging multiple unit-cells in a 2D m×n array. A 3D view of a reconfigurable intelligent surface 608 with 16 rows and 16 columns is shown in FIG. 6. An enlarged view 608(e) from a section of the reconfigurable intelligent surface 608, is shown to highlight the geometry. FIG. 6 also shows the enlarged partial view of a unit cell 602, to better illustrate the reflective element patterned on the metallic layer on top substrate, each loaded with a surface mount varactor diode. One or more PIN diodes can also be used to the vary phase of a unit cell.

The element size and the spacing between elements are around a half wavelength. Using a smaller element size and spacing (for example around a quarter of wavelength or even smaller) can allow for better approximation of the necessary phase profile and improve beam redirecting performance, at the cost of larger interelement coupling and increased fabrication costs due to smaller feature sizes and tighter fabrication tolerances. In many cases, half wavelength provides an adequate middle ground for realizing the beam steering performance while keeping the fabrication costs low.

As is understood, to obtain the desired reconfigurable reflection, an electromagnetic wave at a resonance frequency within the operational band is transmitted to impinge on the unit cells. The reflected wave is modulated through varactor capacitance adjustments.

Figure 7:
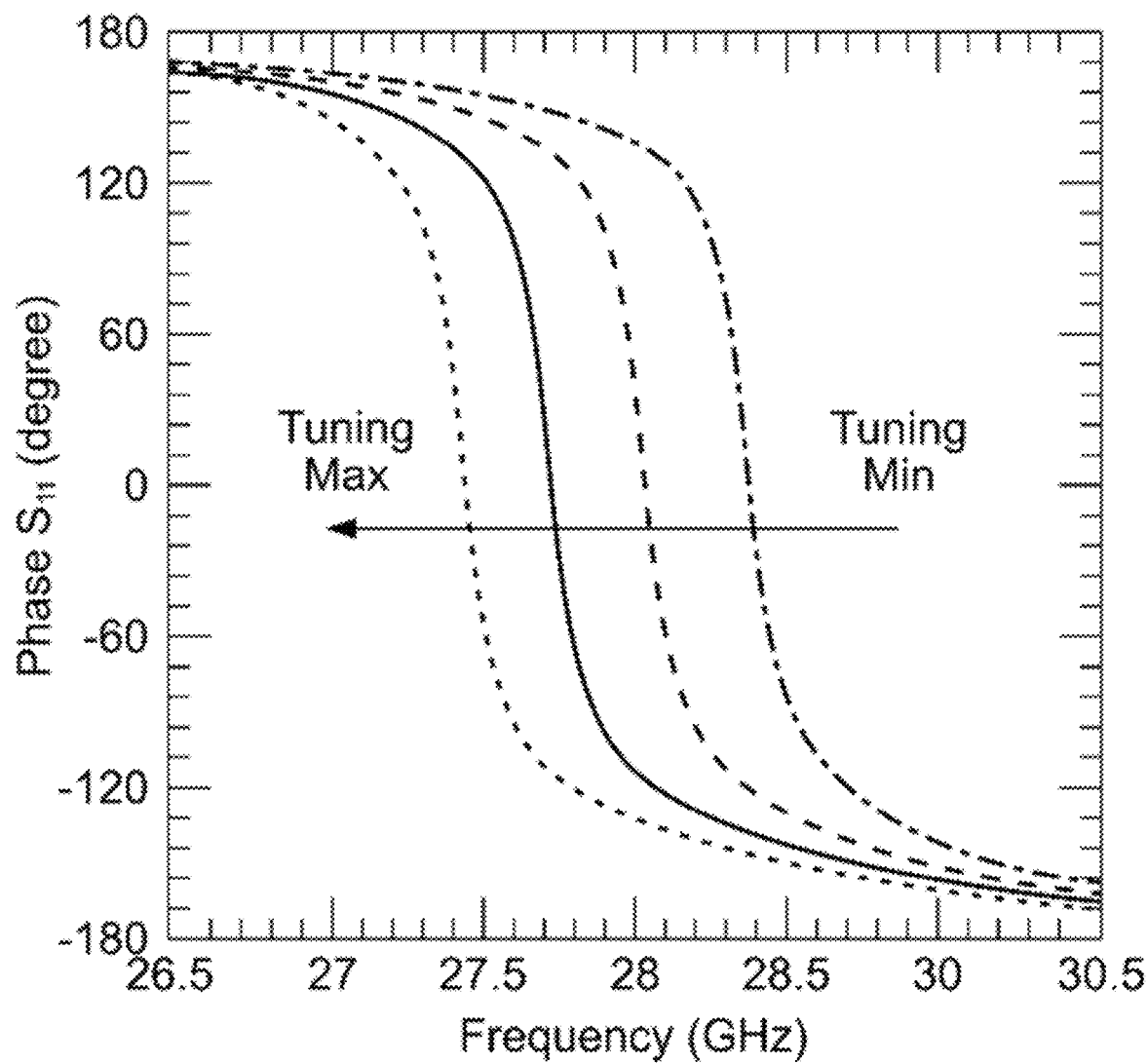
FIG. 7 is a graphical representation of phase of a reflected signal around the operational frequency of 28 GHz, as varied with the change in capacitance of varactor, in accordance with various example embodiments and implementations of the subject disclosure.
Figure 8:
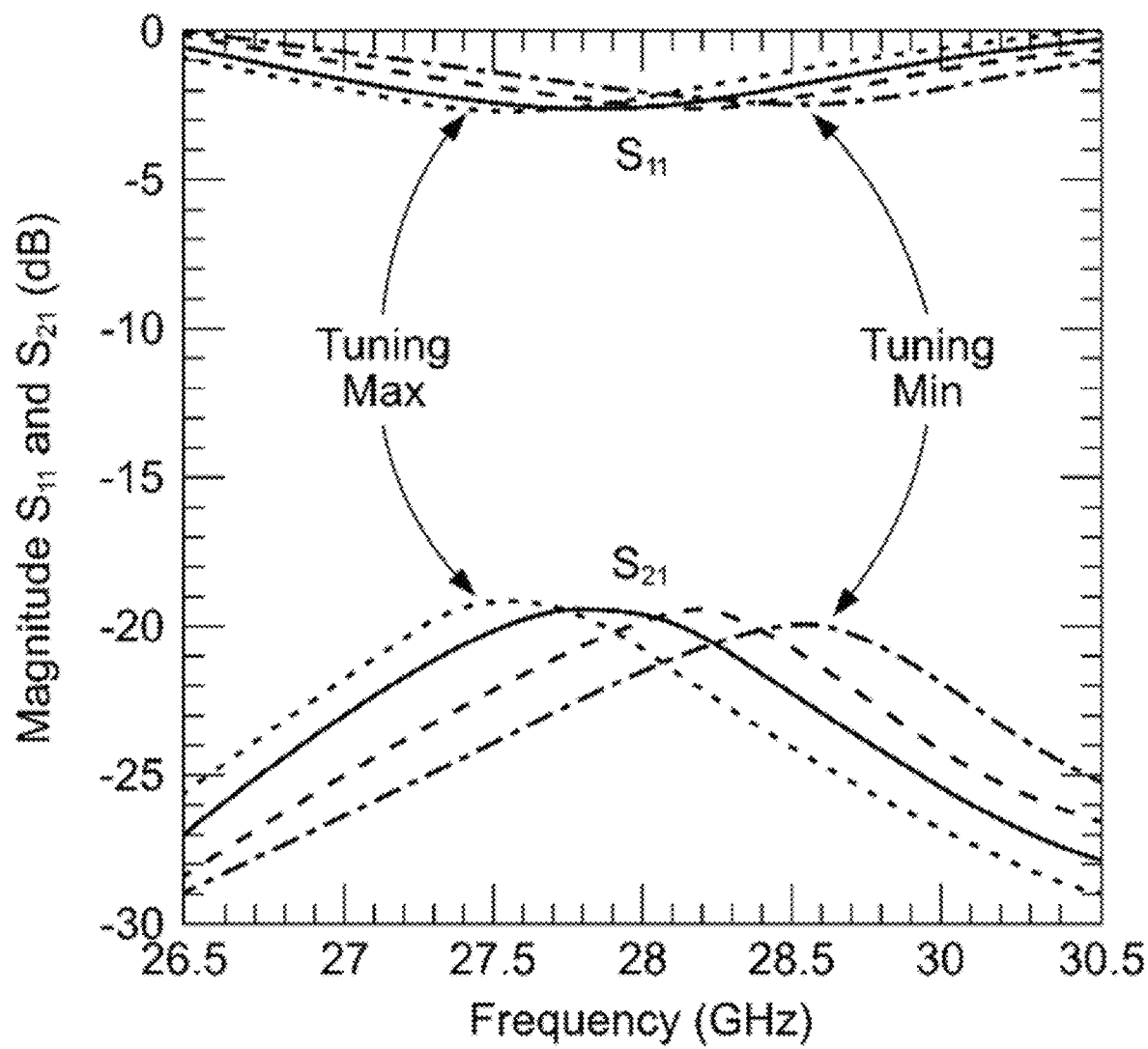
FIG. 8 is a graphical representation of the magnitude of the reflected signal, and the magnitude of the signal coupled to a substrate integrated waveguide, for different varactor capacitances, in accordance with various example embodiments and implementations of the subject disclosure.

The unit cell's functionality can be evaluated through simulations conducted with commercially available three-dimensional full-wave EM simulation software. The way a unit cell reflects and passes on signals explains the operational dynamics of a reconfigurable intelligent surface with EM waves. The simulation outcomes, presented in FIGS. 7 and 8, show a unit cell's reflective capacity and its interaction with the substrate integrated waveguide via scattering parameters. Within this framework, $S_{11}$ delineates the reflection off the reconfigurable intelligent surface element, while $S_{21}$ signifies the signal's engagement with the substrate integrated waveguide. As shown in FIG. 8, the magnitude of the signal collected by substrate integrated waveguide ($S_{21}$) is maintained below −19 dB across all capacitance variations within the varactor's adjustable range. Concurrently, the magnitude of the reflected signal ($S_{11}$) remains above −3 dB. The interplay between the reconfigurable intelligent surface element and substrate integrated waveguide is modifiable by tweaking the coupling probe.

In the reconfigurable intelligent surface assembly, the unit cells designated for signal absorption can effectively channel most (e.g., ninety percent or better) of the incoming signal through the substrate integrated waveguide, targeting an ideal $S_{21} \leq -2$ dB (indicating maximum signal absorption) and an $S_{11}$ of $\geq -20$ dB (indicating minimal signal reflection). The "absorbed signal" (channeled through the substrate integrated waveguide) is harnessed for RF energy harvesting, generating DC voltage to power the energy-consuming parts of the reconfigurable intelligent surface panel. Additionally, the $S_{11}$ phase responses (FIG. 7) show the reflective phase variations when adjusting the varactor's capacitance, which is needed for a reconfigurable intelligent surface to precisely direct the reflected signal.

Identifying an optimal balance between the quantity of cells allocated for signal reflection and those dedicated to signal absorption for energy harvesting is a significant design consideration. This equilibrium can be achieved with the design consideration that the signal-to-noise ratio for the reflected signal remains high, while employing some cells for signal absorption. For example, placement of the reconfigurable intelligent surface, along with adjusting the amplitude and phase responses of its unit cells to optimize the overall signal-to-noise ratio, helps to ensure autonomous operation based on harvested power.

Figure 9:
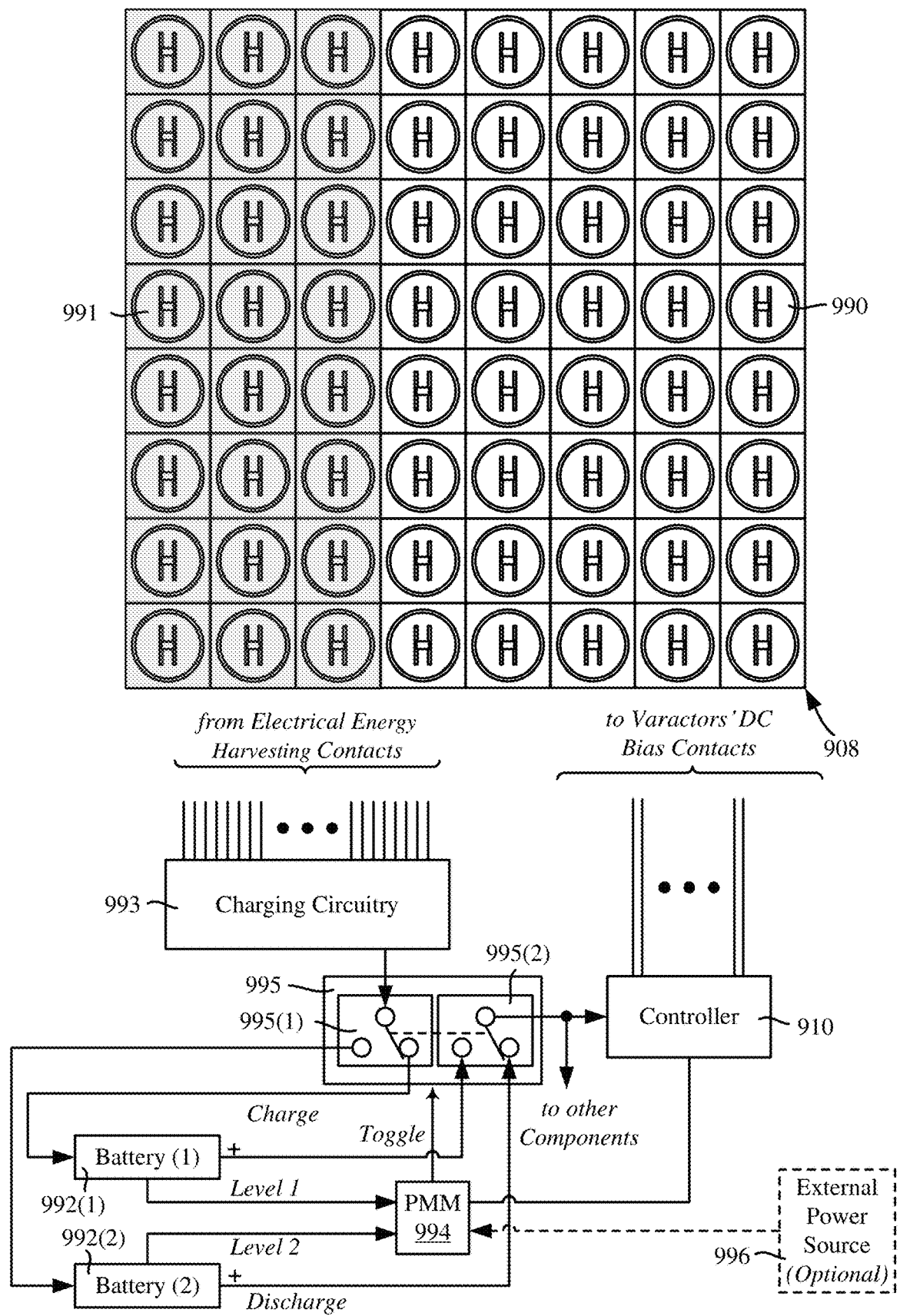
FIG. 9 is a top view representation of an example reconfigurable intelligent surface showing how energy collected from electrical energy harvesting contacts of unit cells can be used to selectively charge batteries, in accordance with various example embodiments and implementations of the subject disclosure.

FIG. 9 is a top view representation of an example 8×8 array of sixty-four unit cells of a reconfigurable intelligent surface 908, with each unit cell generally corresponding to one of the example unit cells 102 or 202 of FIG. 1 or 2, respectively. One of the unit cells that is designed for redirecting the incoming wave is labeled 990 in FIG. 9; the unit cells for redirecting the incoming wave are depicted as unshaded, including the unit cell 990. One of the unit cells that is designed for energy harvesting is labeled 991 in FIG. 9; the unit cells for energy harvesting are depicted as shaded, including the unit cell 991. As can be readily appreciated, the distribution pattern need not be such that the unit cells of each type are grouped together, and, as set forth herein, the number of unit cells of each type, as well as the total number in the m×n array, can be determined during design, e.g., for a particular reconfigurable intelligent surface deployment.

As represented in FIG. 9, a controller 910 is coupled to provide respective varactor biasing voltages to the respective unit cells' bias contacts coupled to the respective varactors (and/or other variable tuning devices). Further, the controller 910 is coupled to a battery (currently the battery (2) 992(2) in the example of FIG. 9) to obtain the power needed to adjust the varactors.

As described herein, charging circuitry 993 charges a selected one of the batteries (currently the battery (1) 992(1) in the example of FIG. 9) while the other battery 992(2) powers the controller 910 and any other power consuming components of the reconfigurable intelligent surface, such as memory (if not internal to the controller) for storing different sets of the unit cell's phases, communication circuitry for obtaining the different sets of the unit cell's phases, power consuming devices of the charging circuitry 993 (further described with reference to FIGS. 10 and 11), and so on. The reconfiguration instructions can be received wirelessly at the controller 910, which then provides the corresponding voltage biases to the individual varactors/PIN diodes/other variable tuning devices of the reconfigurable intelligent surface elements.

A power management module (PMM, /a power management unit (PMU)) 994 monitors the charge levels of the batteries 992(1) and 992(2), and, for example, if the battery currently being discharged to provide power satisfies a discharge threshold level, actuates a double-pole, double-throw (DPDT) switch 995 (represented by jointly-actuated internal switch parts 995(1) and 995(2)), such that the batteries 992(1) and 992(2) swap roles, that is, the battery 992(1) starts powering the components while the battery 992(2) begins recharging; (instead of a double-pole, double-throw switch, separate switches can be used and jointly toggled by the power management module 994). Note that if the battery 992(1) is fully charged (or deemed sufficiently charged to a threshold charge level), this can also cause the power management module 994 to toggle the DPDT switch 995. It is also possible to have more than two batteries and/or other power storage devices (e.g., capacitors).

An optional external power source 996 may be used, if available, in the event that the battery being charged is still too low to take over for a fully or mostly discharged battery. The optional external power source 996, if present, can also be used to assist in charging the batteries in such a condition. Note however that one of the design considerations is to provide a fully autonomous, self-powered reconfigurable intelligent surface that (e.g., during its normal lifetime) never needs such an external power source.

To summarize, the generated DC power is used to charge batteries (or alternatively capacitors) serving as energy storage devices. These devices operate in a cyclical manner; one charges while the other discharges to power the control chips and rectifying circuits. Upon one device being (e.g., fully) charged and/or the other sufficiently depleted, they switch roles. A power management module/device (or unit, PMU) oversees the decision to either store the harvested electricity or use the stored energy. One implementation of the system thus utilizes a dual-battery configuration with this power management system, employing a harvest-store-use model over a direct harvest-use approach. With the harvest-store-use strategy, the system is outfitted with an energy storage solution or rechargeable battery that holds the harvested electricity. This arrangement allows for the storage of surplus energy when the amount harvested exceeds the system's energy use for subsequent utilization. Note that with a direct harvest-use strategy, the energy collected is used instantly to operate the network node, necessitating that the produced electricity perpetually surpasses the node's minimal energy requirement to maintain normal function; failing this, the node becomes inoperative, which means that the direct harvest-use strategy is more likely to become inoperative unless a large, oversubscribed number of unit cells are dedicated to harvesting, (likely meaning a larger, more expensive reconfigurable intelligent surface).

Figure 10:
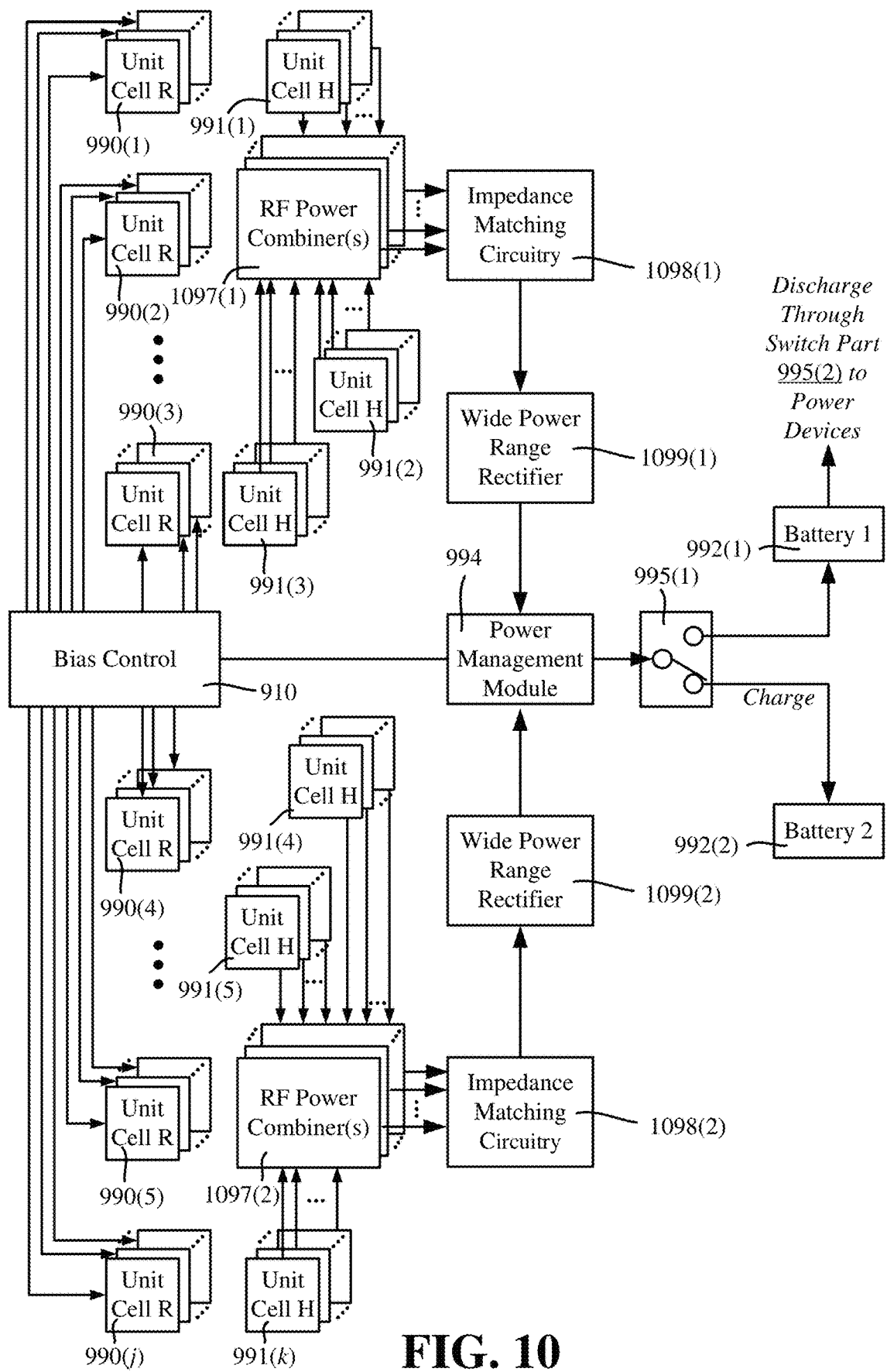
FIG. 10 is a block diagram representation of example charging circuitry for charging one battery while another battery is discharging to power devices, including power for a controller/varactors of a reconfigurable intelligent surface, in accordance with various example embodiments and implementations of the subject disclosure.

FIG. 10 shows details of example charging circuitry, including the power management module 994, the switch part 995(1) that is toggled for selective charging, and the two batteries 992(1) and 992(2). In the example of FIG. 10, the unit cells for redirection "Unit Cell R" of the incoming wave are represented as subgroups 990(1)-990(j), while the unit cells for energy harvesting "Unit Cell H" from the incoming wave are represented as subgroups 991(1)-991(k). The unit cells 990(1)-990(j) for redirection of the incoming wave are coupled to the bias control/controller 910.

In this example, the harvested energy at the electrical energy harvesting contacts of the unit cells 991(1)-991(k) are electrically coupled to one or more RF power combiners 1097(1) and one or more RF power combiners 1097(2), which combine the harvested energy. In turn, the combined energy is input to impedance matching circuitry (e.g., networks) 1098(1) and 1098(2), respectively, and then to respective wide power range rectifiers 1099(1) and 1099(2). Note that the power is combined from the array of cells/subgroups 991(1)-991(k) of the array, and (although not depicted as such in FIG. 10) there can be only a single combiner, or there can be multiple combiners that feed to a next combiner and so on; alternatively there can be multiple combiners (e.g., one per row or column of harvesting-type cells), that feed to multiple impedance matching networks, and/or only one wide power range rectifier, and so on.

Figure 11:
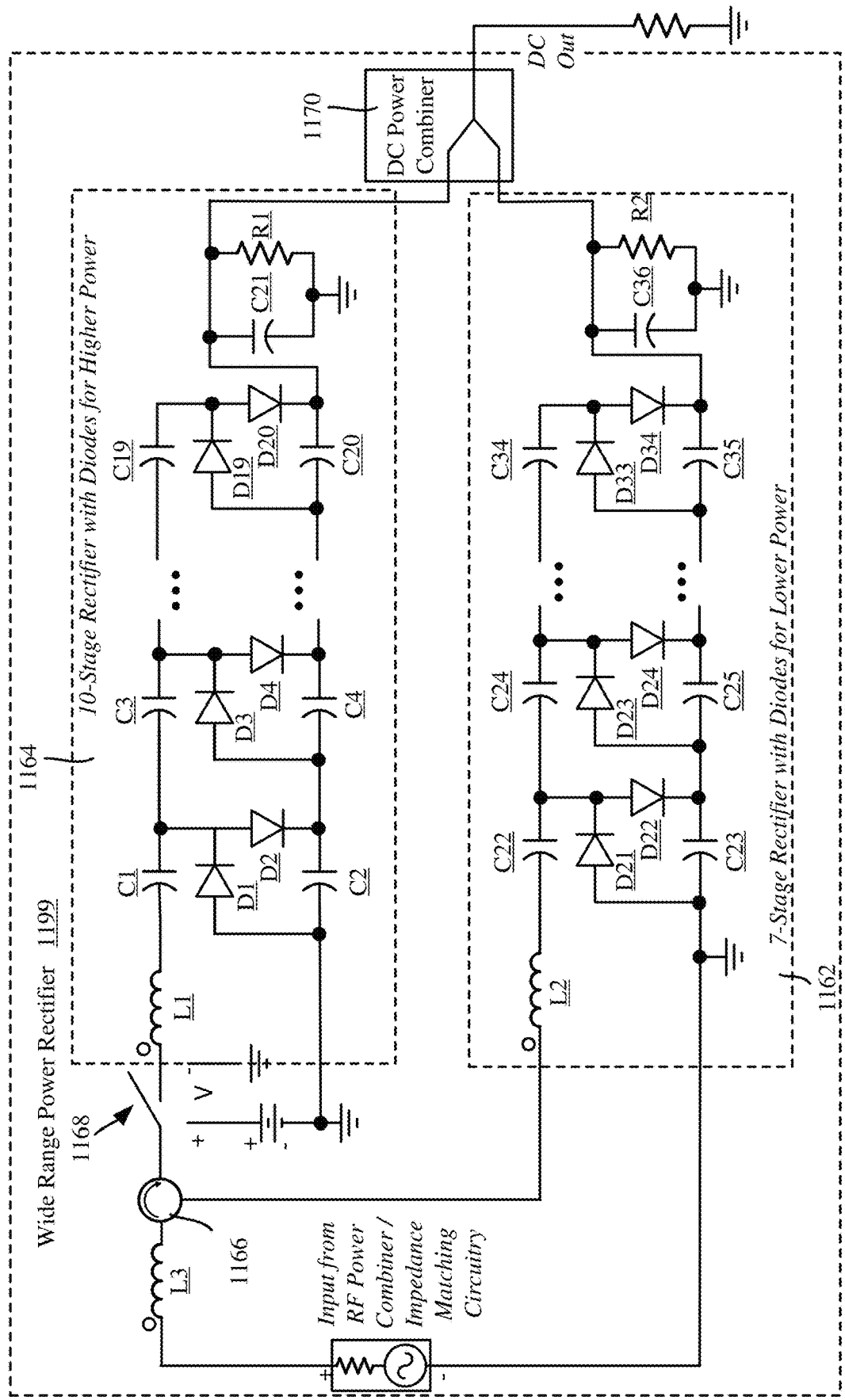
FIG. 11 is a representation of an example wide range power rectifier with different multistage rectifier subcircuits that can be used in the charging circuitry of FIG. 9, in accordance with various example embodiments and implementations of the subject disclosure.

The power management module 994 receives the DC power from the rectifiers 1099(1) and 1099(2), and uses the combined power to charge the battery currently coupled to the power management module 994 by the switch 995(1), which is the battery 992(2) in the example of FIG. 10. A wide range power rectifier 1199 is shown in FIG. 11.

The wide range power rectifier 1199 is capable of accommodating a broad spectrum of power levels, ranging from as low as −20 dBm up to +30 dBm, in one implementation. The architecture of one such wide range rectifier, shown in FIG. 11, is engineered with two distinct subcircuits 1162 and 1164; the subcircuit 1162 is optimized for high efficiency at lower power levels, and the other subcircuit 1164 for optimized for higher power scenarios. This dual-circuit approach leverages different types of diodes to achieve efficiency across the power spectrum; diodes with lower threshold voltages excel in low power conditions, while those with higher thresholds are better suited for elevated power levels.

To harness the advantages of both subcircuits effectively, a device for toggling between the two subcircuits 1162 and 1164 based on the incoming power level is employed. This switching device includes a three-port device circulator 1166 and a self-actuating RF switch 1168, e.g., a vanadium dioxide ($VO_2$)-based power sensitive RF switch. The first port of the three-port device circulator 1166 receives the combined RF input, the second port connects to the higher power (e.g., ten-stage) rectifier subcircuit 1164 via the power sensitive RF switch 1168, and the third port connects to the lower power a (e.g., seven-stage) rectifier subcircuit 1162. At lower input power levels, the switch 1168 is open, whereby the signal flows from the input Port 1 to Port 3 (reflected back from the open switch), directing the combined RF signal to the lower power rectifier subcircuit 1162, as Port 2 remains in an open circuit state (with the switch deactivated/self-de-actuated). Conversely, with higher input power level at Port 1, the $VO_2$ switch 1168 self-actuates and the input signal is routed to the higher power (e.g., ten-stage) rectifier subcircuit 1164; no signal goes to the Port 3 of the circulator 1166.

Thus, for this rectifier subcircuit switching, a combination of a circulator and a power-dependent $VO_2$ switch can be used. Note that such a $VO_2$ switch self-actuates at different input RF power levels based on different design dimensions and specifications, which have been previously measured. In general, the switch design utilizes a series shunt architecture, and has known self-switching and recovery data for different channel lengths, and power transmission characteristics of VO2 switches. Significant hysteresis can be observed in the self-switching and recovery.

At any given time, the output from either of the rectifier subcircuits is combined using a DC power combiner 1170. This generated DC power is used to charge batteries and/or capacitors, serving as energy storage devices.

In one implementation of the rectifier subcircuits' designs, a Dickson voltage rectifier type circuit can be used; a Dickson voltage rectifier (an active circuit) can provide high energy efficiency. Even higher energy efficiency can be achieved if the Dickson voltage rectifier is made using fully depleted silicon-on-insulator (FD-SOI) technology. There is a direct correlation between the output voltage and the number of stages, although practical limits cap the maximum stages and, consequently, the output voltage.

The rectifier's performance is significantly determined by the diode's characteristics, such as its saturation current, junction capacitance, and conduction resistance. The selection of an appropriate diode is thus part of the design of a rectifier to ensure maximum efficiency at a given power level; a commercially available Schottky diode (e.g., by Central Semiconductor CMSH1-20M) has been found suitable for the lower RF power range. Conversely, for the higher power circuit, a different commercially available diode can be used, (e.g., ST Microelectronics STPS20H100CT diode), which has been found suitable with respect to the energy conversion efficiency at higher input RF power.

The design for a rectifier circuit shown in FIG. 11 (and subcircuits with similar multiple stages) can be simulated using a circuit simulation tool (e.g., an Advanced Design System tool). The power typically received from unit cell element is replaced with a power source featuring a 50-Ohm internal impedance. The energy conversion efficiency in harvesting circuits is significantly affected by the number of rectifier stages. Each stage is a modified voltage multiplier, arranged in series. For the lower power subcircuits, simulations were run for configurations with five stages, seven stages, and nine stages, while for the higher power subcircuit, the configurations of eight stages, ten stages, and twelve stages were evaluated, as shown in FIG. 12.

Figure 12:
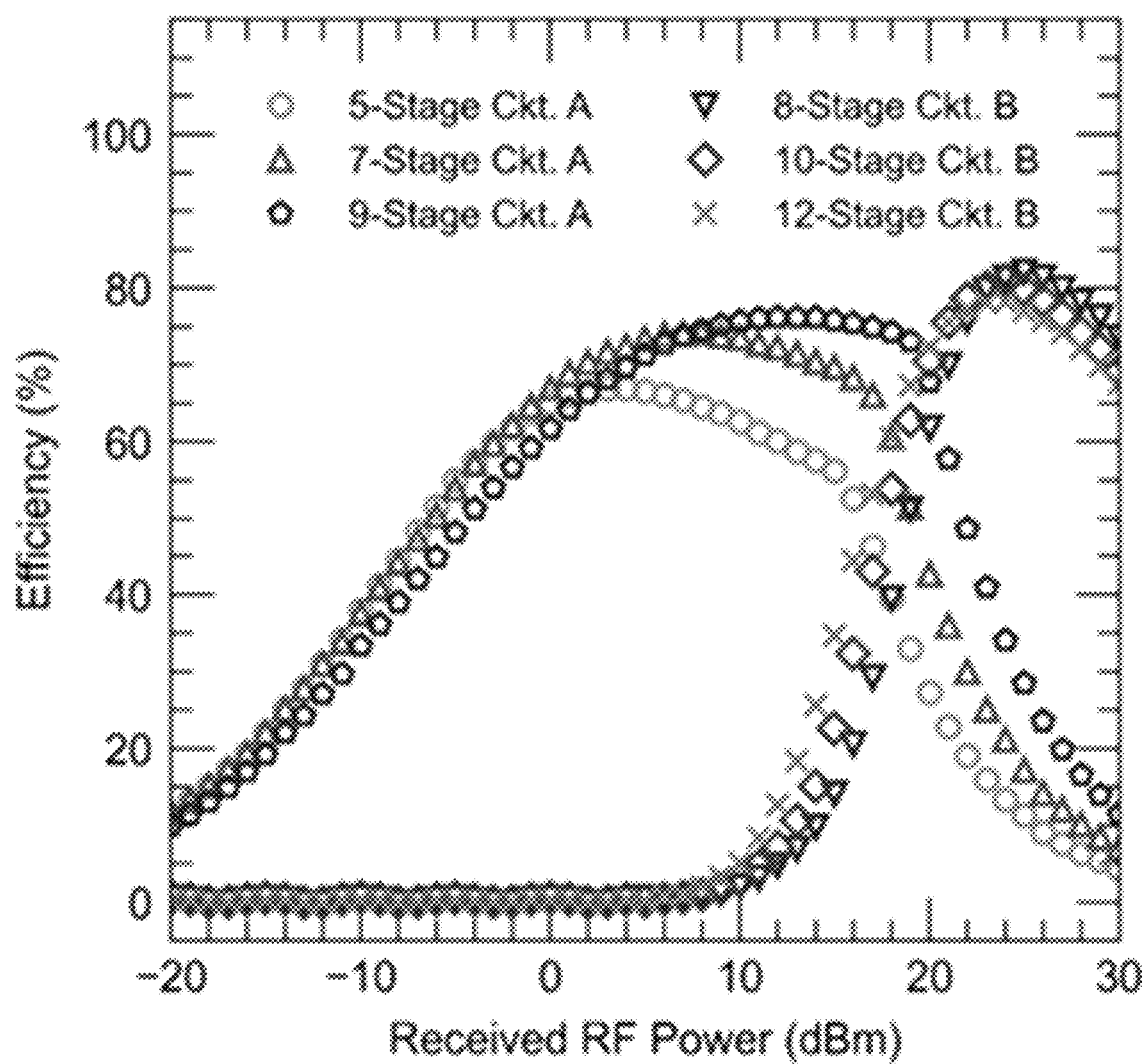
FIG. 12 is an example graphical representation of power conversion efficiency versus received radio frequency power for different stages of rectifiers, in accordance with various example embodiments and implementations of the subject disclosure.
Figure 13:
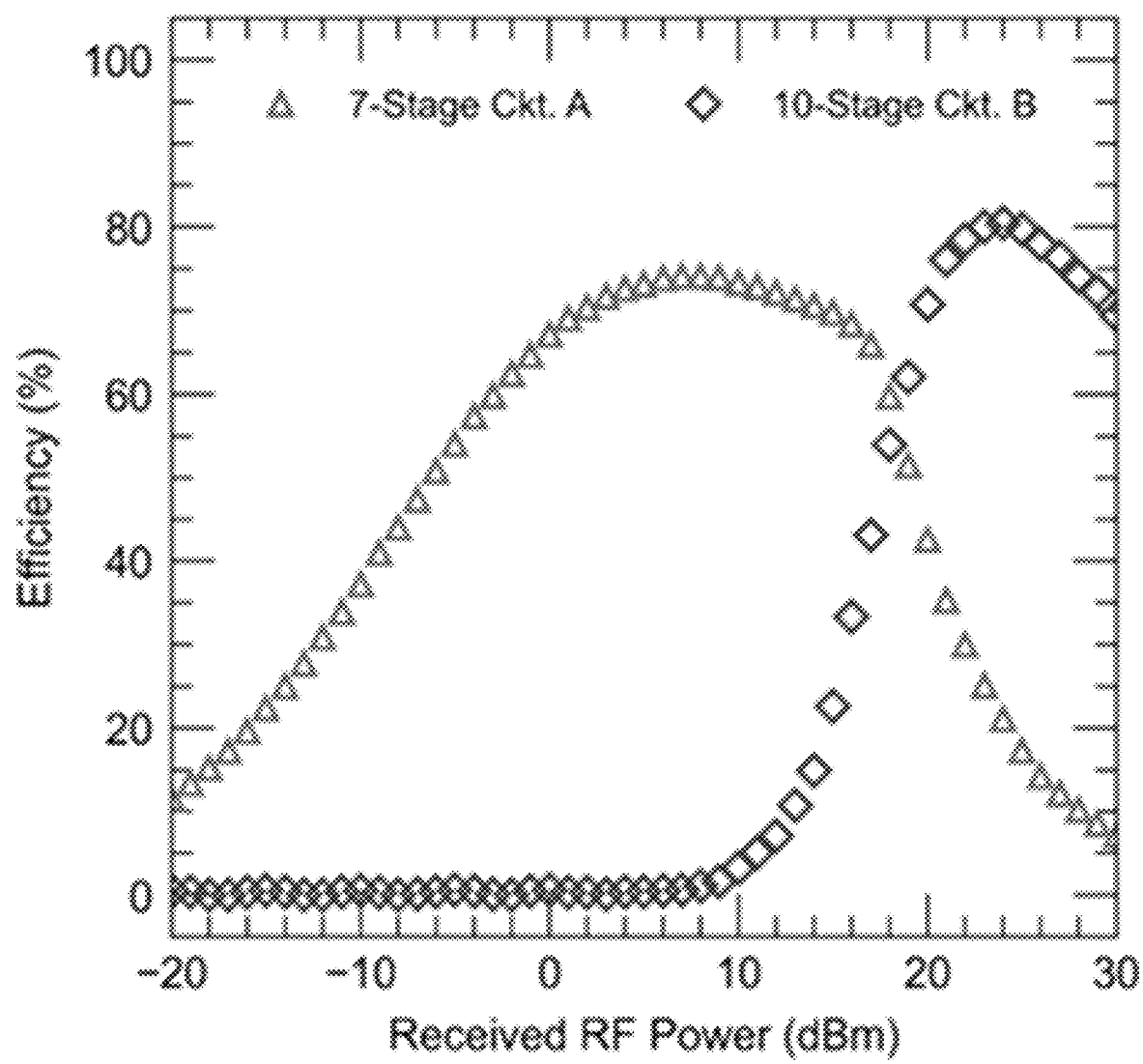
FIG. 13 is an example graphical representation of power conversion efficiency versus received radio frequency power for a seven stage rectifier and a ten-stage rectifier, in accordance with various example embodiments and implementations of the subject disclosure.

The simulation outcomes, which span input RF powers from −20 dBm to 30 dBm across various circuit stages, indicate that adding more stages enhances efficiency, as shown in the example graphical representation of power conversion efficiency versus input RF power for different stages of rectifiers for both subcircuits in FIG. 12. This addition not only improves efficiency but also shifts the peak efficiency to higher power levels. To achieve optimal efficiency across the entire power spectrum, as shown in FIG. 13, a seven-stage rectifier configuration was chosen for the lower power subcircuit 1162, and a ten-stage rectifier configuration was chosen for the higher power subcircuit 1164. As shown in FIG. 13, by toggling between these two configurations at the crossover point of 19 dBm, the most efficient scenario is achieved.

For example, because higher RF signal energy is available for a reconfigurable intelligent surface located closer to the transmitter, at that time the ten-stage rectifier subcircuit 1164 (FIG. 11) is activated. When the reconfigurable intelligent surface is placed further away from the transmitter, the input RF signal energy is lower, whereby the seven-stage rectifier subcircuit is activated. As a result, the best efficiency is achieved from either of the rectifier subcircuits depending on the input RF power level.

Each reconfigurable intelligent surface component is selected for a specific frequency, with impedance matching achieved through a resonator circuit tuned to this frequency, enhancing the power transfer efficiency between the reconfigurable intelligent surface components and the multiplier. The efficiency of RF energy harvesting depends on the power of the transmitted signal, its wavelength, and distance between the RF source and the reconfigurable intelligent surface panel.

The circuits employed for impedance matching networks in energy harvesting circuits include LC (inductor/capacitor) networks (which typically are passive but can be active devices). The function of the wide power range rectifier is to convert the input RF signals (AC type) captured by reconfigurable intelligent surface elements into DC voltage, which does so efficiently regardless of the input power.

One or more example embodiments can be embodied in a system, such as described and represented herein. The system can include a reconfigurable intelligent surface that redirects an incoming electromagnetic signal as a redirected electromagnetic signal, and respective first unit cells of the reconfigurable intelligent surface. The respective first unit cells can include respective variable tuning devices that are controllable to determine at least one of: a shape, a direction, or an amplitude of the redirected electromagnetic signal. The system can further include respective second unit cells of the reconfigurable intelligent surface, which can include respective substrate integrated waveguides configured to capture respective portions of energy of the incoming electromagnetic signal, respective electrical contacts, and respective coupling probes that extend into the respective substrate integrated waveguides to transfer harvested electrical energy to the respective electrical contacts based on the respective portions of energy captured in the respective substrate integrated waveguides. Electrical charging circuitry can be coupled between the respective electrical contacts and an energy storage device, and the electrical charging circuitry can be configured to convert the harvested electrical energy from the respective electrical contacts to direct current that charges the energy storage device.

The electrical charging circuitry can include a wide power range rectifier circuit, comprising a power-dependent radio frequency switch that self-actuates at a defined high radio frequency power level, resulting in coupling a first higher power rectifier subcircuit to the harvested electrical energy to output the direct current that charges the energy storage device, and self-de-actuates below the defined high radio frequency power level, resulting in coupling a second lower power rectifier subcircuit to the harvested electrical energy to output the direct current that charges the energy storage device.

The first higher power rectifier subcircuit can include a first multistage rectifier subcircuit having an even number of stages, and the second lower power rectifier subcircuit can include a second multistage rectifier subcircuit having an odd number of stages.

The harvested electrical energy can be combined and coupled to a first port of a multi-port device circulator; the multi-port device circulator can have a second port coupled to the power-dependent radio frequency radio switch for coupling the first higher power rectifier subcircuit to the harvested electrical energy in response to the power-dependent radio frequency radio switch self-actuating, and a third port coupled to the second lower power rectifier subcircuit for coupling the second lower power rectifier subcircuit to the harvested electrical energy in response to the power-dependent radio frequency radio switch self-de-actuating.

The power-dependent radio frequency switch can include vanadium dioxide.

The energy storage device can include a first battery, and further can include a second battery, a controller, and a switch that is operational in a first state to couple the first battery to the electrical charging circuitry, in conjunction with the second battery providing power to the controller and to the respective variable tuning devices of the respective first unit cells; the respective variable tuning devices can be controllable by the controller to determine the at least one of: the shape, the direction, or the amplitude of the redirected electromagnetic signal. The switch can be operational in a second state to couple the second battery to the electrical charging circuitry, in conjunction with the first battery providing power to the controller and to the respective variable tuning devices of the respective first unit cells. A power management unit can toggle the switch between the first state and the second state based on at least one of: a first level of charge of the first battery, or a second level of charge of the second battery.

The electrical charging circuitry can include a radio frequency power combiner comprising inputs electrically coupled to the respective electrical contacts.

The electrical charging circuitry can include an impedance matching circuit electrically coupled to an output of the radio frequency power combiner.

One or more example embodiments can be embodied in a system, such as described and represented herein. The system can include a reconfigurable intelligent surface of unit cells, wherein at least some of the unit cells can include respective substrate integrated waveguides that obtain respective portions of energy from an impinging radio frequency (RF) electromagnetic signal, and couple the respective portions of energy to respective energy harvesting contacts through respective via probes extending into the respective substrate integrated waveguides. The system can further include electrical charging circuitry, which can include RF power combiner circuitry coupled to the respective energy harvesting contacts to combine the respective portions of energy harvested from the respective energy harvesting contacts into combined RF input, and a wide power range rectifier circuit. The wide power range rectifier can include a switch that self-actuates into a closed state at a defined high RF power level, and self-de-actuates into an open state below the defined high RF power level, and a circulator comprising a first input port coupled to the combined RF input, a second output port coupled to the switch, and a third output port coupled to a lower power multistage rectifier. In the closed state, the circulator routes the combined RF input through the switch to a higher power multistage rectifier that outputs first direct current (DC) power to a DC power combiner, and in the open state, the circulator routes the combined RF input to the lower power multistage rectifier that outputs second DC power to the power combiner. An energy storage device can be coupled to the DC power combiner to charge the energy storage device based on the respective portions of energy harvested from the respective energy harvesting contacts.

The higher power multistage rectifier can include a first multistage rectifier subcircuit having ten stages, and the lower power multistage rectifier can include a second multistage rectifier subcircuit having seven stages.

At least some of the unit cells can be respective first unit cells, the energy storage device can be a first energy storage device, the switch can be a first switch, and the system further can include a controller, and a second switch that is operational in a first state to couple the first energy storage device to the electrical charging circuitry, in conjunction with a second energy storage device providing power to the controller and to respective variable tuning devices of respective second unit cells of the reconfigurable intelligent surface; the respective variable tuning devices can be controllable by the controller to determine at least one of: a shape, a direction, or an amplitude of a redirected instance from the respective second unit cells of the impinging RF electromagnetic signal. The switch can be operational in a second state to couple the second battery to the electrical charging circuitry, in conjunction with the first battery providing power to the controller and to the respective variable tuning devices of the respective second unit cells.

The energy storage device can include at least one of: a battery, or a capacitor.

Figure 14:
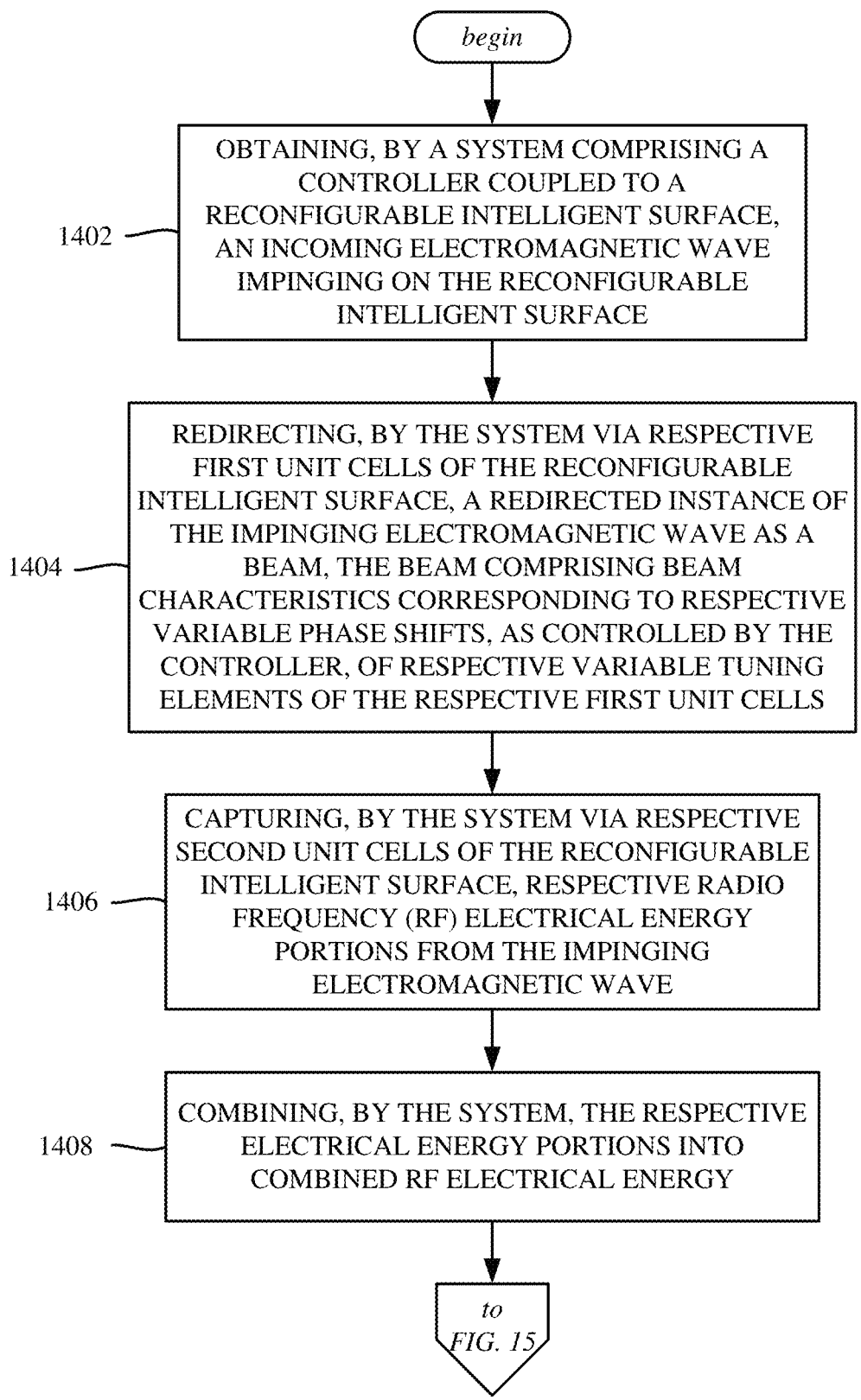
FIGS. 14 and 15 comprise a flow diagram showing example operations related to charging a first battery with combined and rectified harvested energy from one group of unit cells, while powering a controller from a second battery to control tuning elements of another group of unit cells, in accordance with various example embodiments and implementations of the subject disclosure.
Figure 15:
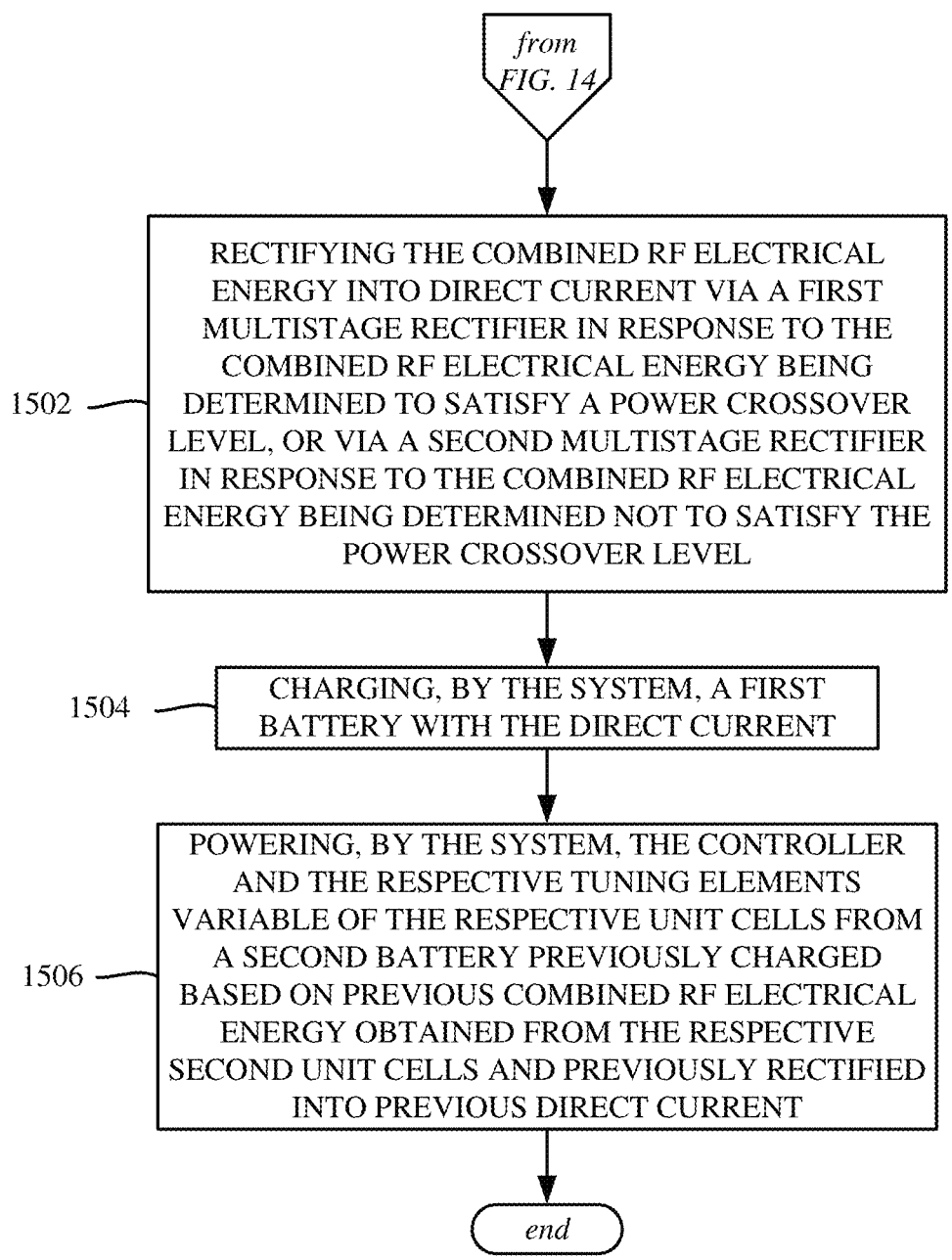

One or more example aspects, such as corresponding to example operations of a method, or a system/a machine-readable medium having executable instructions that, when executed by a processor, facilitate performance of the operations, are represented in FIG. 14. Example operation 1402 represents obtaining, by a system comprising a controller coupled to a reconfigurable intelligent surface, an incoming electromagnetic wave impinging on the reconfigurable intelligent surface. Example operation 1404 represents redirecting, by the system via respective first unit cells of the reconfigurable intelligent surface, a redirected instance of the impinging electromagnetic wave as a beam, the beam comprising beam characteristics corresponding to respective variable phase shifts, as controlled by the controller, of respective variable tuning elements of the respective first unit cells. Example operation 1406 represents capturing, by the system via respective second unit cells of the reconfigurable intelligent surface, respective radio frequency (RF) electrical energy portions from the impinging electromagnetic wave. Example operation 1408 represents combining, by the system, the respective electrical energy portions into combined RF electrical energy. The operations continue at FIG. 15, where example operation 1502 represents rectifying the combined RF electrical energy into direct current via a first multistage rectifier in response to the combined RF electrical energy being determined to satisfy a power crossover level, or via a second multistage rectifier in response to the combined RF electrical energy being determined not to satisfy the power crossover level. Example operation 1504 represents charging, by the system, a first battery with the direct current. Example operation 1506 represents powering, by the system, the controller and the respective tuning elements variable of the respective unit cells from a second battery previously charged based on previous combined RF electrical energy obtained from the respective second unit cells and previously rectified into previous direct current.

Further operations can include switching, by the system, to charge the second battery based on the direct current, and to power the controller and respective tuning elements of the respective first unit cells from the first battery.

Further operations can include determining, by a power management device of the system, whether to perform the switching based on at least one of: a first level of charge of the first battery, or a second level of charge of the second battery.

Further operations can include coupling, by the system, the combined RF energy to the first multistage rectifier via a switch that, in response to the combined RF energy being determined to satisfy the power crossover level, self-actuates to couple the combined RF energy to the first multistage rectifier.

The respective second unit cells can include respective substrate integrated waveguides, capturing the respective RF electrical energy portions via the respective second unit cells can include coupling respective electrical harvesting contacts to respective via probes that extend into the respective substrate integrated waveguides of the second unit cells to obtain the respective RF electrical energy portions, and combining the respective electrical energy portions into the combined RF energy can include coupling the respective harvesting contacts to at least one RF power combiner.

As can be seen, the technology described herein is directed to a reconfigurable intelligent surface arranged with two types of unit cells, one type designed for signal reflection, while the other type is used for signal absorption for energy harvesting. The technology results in a self-sufficient operational model for a reconfigurable intelligent surface, eliminating (or at least substantially reducing) the need for power consumed from an external power source. The technology described herein thus significantly contributes to the advantage of reconfigurable intelligent surface technology's reduced power consumption when compared to traditional active relays.

One implementation incorporates a substrate integrated waveguide seamlessly integrated with the unit cells, designed for energy harvesting to capture the incoming energy. This energy, from a collective of cells is combined using an RF combiner, and then provided to an energy harvesting circuit which converts this AC energy into DC energy. This harvested energy is then stored in a battery for meeting the energy needs of the reconfigurable intelligent surface panel, including when used with a double battery approach.

Employing a power-dependent switchable multimode (low power mode and high power mode) rectifier can significantly improve the system's ability to efficiently harvest energy across a broad range of incoming signal strengths, with a topology designed to ensure high energy conversion efficiency, regardless of whether the reconfigurable intelligent surface is positioned very close to, or at a greater distance from, the signal transmitter, presenting a versatile solution for energy harvesting in various deployment scenarios.

In general, because of their ability to achieve lower energy use, reconfigurable intelligent surface-assisted communications are preferable to using active relay systems. The technology described herein is directed to a hardware method/circuit for use with reconfigurable intelligent surface elements, to provide self-sustaining reconfigurable intelligent surface operation through energy harvesting from incoming electromagnetic signals. Such self-sufficiency can be achievable if the reconfigurable intelligent surface's electronic components' average power consumption is on the order of a few microwatts.

For fully self-powered reconfigurable intelligent surfaces, such autonomous functionality can be particularly beneficial in various settings; for instance, in locations where power grids are unavailable or in situations where aesthetic considerations impede the installation of reconfigurable intelligent surfaces on certain structures, like trees. Moreover, aesthetic concerns can make it challenging to obtain permissions for installing external power cables on building exteriors to power the reconfigurable intelligent surfaces. Using large batteries as an energy source is also impractical, as they require ongoing maintenance and frequent replacement.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a reconfigurable intelligent surface that redirects an incoming electromagnetic signal as a redirected electromagnetic signal;
respective first unit cells of the reconfigurable intelligent surface, the respective first unit cells comprising respective variable tuning devices that are controllable to determine at least one of: a shape, a direction, or an amplitude of the redirected electromagnetic signal;
respective second unit cells of the reconfigurable intelligent surface, the respective second unit cells comprising:
respective substrate integrated waveguides configured to capture respective portions of energy of the incoming electromagnetic signal,
respective electrical contacts, and
respective coupling probes that extend into the respective substrate integrated waveguides to transfer harvested electrical energy to the respective electrical contacts based on the respective portions of energy captured in the respective substrate integrated waveguides; and
electrical charging circuitry coupled between the respective electrical contacts and an energy storage device, the electrical charging circuitry configured to convert the harvested electrical energy from the respective electrical contacts to direct current that charges the energy storage device,
wherein the electrical charging circuitry comprises a wide power range rectifier circuit, comprising a power-dependent radio frequency switch that self-actuates at a defined high radio frequency power level, resulting in coupling a first higher power rectifier subcircuit to the harvested electrical energy to output the direct current that charges the energy storage device, and self-de-actuates below the defined high radio frequency power level, resulting in coupling a second lower power rectifier subcircuit to the harvested electrical energy to output the direct current that charges the energy storage device, and
wherein the harvested electrical energy is combined and coupled to a first port of a multi-port device circulator, the multi-port device circulator having a second port coupled to the power-dependent radio frequency radio switch for coupling the first higher power rectifier subcircuit to the harvested electrical energy in response to the power-dependent radio frequency radio switch self-actuating, and a third port coupled to the second lower power rectifier subcircuit for coupling the second lower power rectifier subcircuit to the harvested electrical energy in response to the power-dependent radio frequency radio switch self-de-actuating.

2. The system of claim 1, wherein the first higher power rectifier subcircuit comprises a first multistage rectifier subcircuit having an even number of stages, and wherein the second lower power rectifier subcircuit comprises a second multistage rectifier subcircuit having an odd number of stages.

3. The system of claim 1, wherein the power-dependent radio frequency switch comprises vanadium dioxide.

4. The system of claim 1, wherein the energy storage device comprises a first battery, and further comprising a second battery, a controller, and a switch that is operational in a first state to couple the first battery to the electrical charging circuitry, in conjunction with the second battery providing power to the controller and to the respective variable tuning devices of the respective first unit cells, the respective variable tuning devices controllable by the controller to determine the at least one of: the shape, the direction, or the amplitude of the redirected electromagnetic signal.

5. The system of claim 4, wherein the switch is operational in a second state to couple the second battery to the electrical charging circuitry, in conjunction with the first battery providing power to the controller and to the respective variable tuning devices of the respective first unit cells.

6. The system of claim 5, further comprising a power management unit that toggles the switch between the first state and the second state based on at least one of: a first level of charge of the first battery, or a second level of charge of the second battery.

7. The system of claim 1, wherein the electrical charging circuitry comprises a radio frequency power combiner comprising inputs electrically coupled to the respective electrical contacts.

8. The system of claim 7, wherein the electrical charging circuitry comprises an impedance matching circuit electrically coupled to an output of the radio frequency power combiner.

9. The system of claim 1, wherein the first higher power rectifier subcircuit comprises ten stages, and wherein the second lower power rectifier subcircuit comprises seven stages.

10. The system of claim 1, wherein the energy storage device comprises at least one of: a battery, or a capacitor.

11. A system, comprising:
a reconfigurable intelligent surface of unit cells, wherein at least some of the unit cells comprise respective substrate integrated waveguides that obtain respective portions of energy from an impinging radio frequency (RF) electromagnetic signal, and couple the respective portions of energy to respective energy harvesting contacts through respective via probes extending into the respective substrate integrated waveguides;
electrical charging circuitry, comprising:
RF power combiner circuitry coupled to the respective energy harvesting contacts to combine the respective portions of energy harvested from the respective energy harvesting contacts into combined RF input, and
a wide power range rectifier circuit, comprising:
a switch that self-actuates into a closed state at a defined high RF power level, and self-de-actuates into an open state below the defined high RF power level;
a circulator comprising a first input port coupled to the combined RF input, a second output port coupled to the switch, and a third output port coupled to a lower power multistage rectifier, wherein
in the closed state, the circulator routes the combined RF input through the switch to a higher power multistage rectifier that outputs first direct current (DC) power to a DC power combiner, and
in the open state, the circulator routes the combined RF input to the lower power multistage rectifier that outputs second DC power to the DC power combiner; and
an energy storage device coupled to the DC power combiner to charge the energy storage device based on the respective portions of energy harvested from the respective energy harvesting contacts.

12. The system of claim 11, wherein the higher power multistage rectifier comprises a first multistage rectifier subcircuit having ten stages, and wherein the lower power multistage rectifier comprises a second multistage rectifier subcircuit having seven stages.

13. The system of claim 11, wherein the at least some of the unit cells are respective first unit cells, wherein the energy storage device is a first energy storage device, wherein the switch is a first switch, and further comprising a controller, and a second switch that is operational in a first state to couple the first energy storage device to the electrical charging circuitry, in conjunction with a second energy storage device providing power to the controller and to respective variable tuning devices of respective second unit cells of the reconfigurable intelligent surface of unit cells, the respective variable tuning devices controllable by the controller to determine at least one of: a shape, a direction, or an amplitude of a redirected instance from the respective second unit cells of the impinging RF electromagnetic signal.

14. The system of claim 13, wherein the switch is operational in a second state to couple the second energy storage device to the electrical charging circuitry, in conjunction with the first energy storage device providing power to the controller and to the respective variable tuning devices of the respective second unit cells.

15. The system of claim 11, wherein the energy storage device comprises at least one of: a battery, or a capacitor.

16. A method, comprising:
obtaining, by a system comprising a controller coupled to a reconfigurable intelligent surface, an incoming electromagnetic wave impinging on the reconfigurable intelligent surface;
redirecting, by the system via respective first unit cells of the reconfigurable intelligent surface, a redirected instance of the impinging electromagnetic wave as a beam, the beam comprising beam characteristics corresponding to respective variable phase shifts, as controlled by the controller, of respective variable tuning elements of the respective first unit cells;
capturing, by the system via respective second unit cells of the reconfigurable intelligent surface, respective radio frequency (RF) electrical energy portions from the impinging electromagnetic wave;
combining, by the system, the respective electrical energy portions into combined RF electrical energy;
coupling, by the system, the combined RF electrical energy to a first higher power multistage rectifier via a switch of a wide power range rectifier circuit, wherein the switch:

in response to the combined RF electrical energy being determined to satisfy a power crossover level, self-actuates into a closed state to couple the combined RF electrical energy to the first higher power multistage rectifier, or in response to the combined RF electrical energy being determined not to satisfy the power crossover level, self-de-actuates into an open state to decouple the combined RF electrical energy from the first higher power multistage rectifier;

rectifying the combined RF electrical energy, that has been routed via a circulator, of the wide power range rectifier circuit, comprising a first input port coupled to the combined RF electrical energy, a second output port coupled to the switch, and a third output port coupled to a second lower power multistage rectifier, into direct current, via the first higher power multistage rectifier that outputs first direct current (DC) power to a DC power combiner, through the switch in a closed state, in response to the combined RF electrical energy being determined to satisfy the power crossover level, or via the second lower power multistage rectifier that outputs second DC power to the DC power combiner, through the switch in an open state, in response to the combined RF electrical energy being determined not to satisfy the power crossover level;

charging, by the system, a first battery with the direct current; and powering, by the system, the controller and the respective variable tuning elements of the respective unit cells from a second battery previously charged based on previous combined RF electrical energy obtained from the respective second unit cells and previously rectified into previous direct current.

17. The method of claim 16, further comprising switching, by the system, to charge the second battery based on the direct current, and to power the controller and respective variable tuning elements of the respective first unit cells from the first battery.

18. The method of claim 17, further comprising determining, by a power management device of the system, whether to perform the switching based on at least one of: a first level of charge of the first battery, or a second level of charge of the second battery.

19. The method of claim 16, wherein the respective second unit cells comprise respective substrate integrated waveguides, wherein the capturing of the respective RF electrical energy portions via the respective second unit cells comprises coupling respective electrical harvesting contacts to respective via probes that extend into the respective substrate integrated waveguides of the second unit cells to obtain the respective RF electrical energy portions, and wherein the combining of the respective electrical energy portions into the combined RF electrical energy comprises coupling the respective harvesting contacts to at least one RF power combiner.

20. The method of claim 16, wherein the first higher power multistage rectifier comprises a first multistage rectifier subcircuit having ten stages, and wherein the second lower power multistage rectifier comprises a second multistage rectifier subcircuit having seven stages.

\* \* \* \* \*